(12) United States Patent
Matsutani

(10) Patent No.: US 7,068,821 B2
(45) Date of Patent: Jun. 27, 2006

(54) INFORMATION PROCESSING METHOD AND APPARATUS

(75) Inventor: Shigeki Matsutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 10/052,463

(22) Filed: Jan. 23, 2002

(65) Prior Publication Data

US 2002/0128796 A1    Sep. 12, 2002

(30) Foreign Application Priority Data

Jan. 29, 2001  (JP)  .............................. 2001-020682

(51) Int. Cl.
   *G06K 9/00*  (2006.01)

(52) U.S. Cl. ...................... 382/119; 382/173; 382/197; 382/305; 178/18.01; 434/155

(58) Field of Classification Search ................ 382/115, 382/116, 119, 123, 158, 173, 168, 187, 188, 382/181, 197, 201, 312, 313, 315, 316, 305; 178/19.01, 18.01, 18.03, 18.04; 348/161; 434/155
See application file for complete search history.

(56) References Cited

U.S. PATENT DOCUMENTS

| | | | |
|---|---|---|---|
| 4,653,107 A * | 3/1987 | Shojima et al. | 382/189 |
| 4,718,102 A * | 1/1988 | Crane et al. | 382/185 |

FOREIGN PATENT DOCUMENTS

| | | |
|---|---|---|
| EP | 0 782 090 A2 | 7/1997 |
| EP | 0 848 345 A2 | 6/1998 |
| EP | 0 858 047 A1 | 8/1998 |
| EP | 0 867 827 A2 | 9/1998 |
| JP | 1-295376 | 11/1989 |
| JP | 5-197812 | 8/1993 |

(Continued)

OTHER PUBLICATIONS

S.H.Paek et al., "On-Line Korean Character Recognition by using Two Types of Neural Networks", 1993, International Joint Conference on Neural Networks. pp. 2113-2116.*

(Continued)

*Primary Examiner*—Bhavesh M. Mehta
*Assistant Examiner*—Sheela Chawan
(74) *Attorney, Agent, or Firm*—Fitzpatrick, Cella, Harper & Scinto

(57) ABSTRACT

An input coordinate sequence is acquired by sampling a handwritten input pattern at predetermined intervals, and a pattern expressed by this input coordinate sequence is approximated by coupling a plurality of line segments to attain line segment conversion. Adjacent angle data $\phi[i]$ is generated based on the directions of the respective line segments. At this time, the segment line length along line segments of all the line segments is divided by a predetermined value at equal intervals, and the angles obtained from the directions of the line segments at respective division positions are defined as $\phi[i]$. This $\phi[i]$ is compared with a standard pattern (adjacent angle distribution data) prepared in advance to obtain a matching level. In this way, more accurate pattern matching for a handwritten input, which is approximately invariant to affine transformation and can reduce the influence of discretization errors can be implemented.

24 Claims, 25 Drawing Sheets

U.S. PATENT DOCUMENTS

| | | | | |
|---|---|---|---|---|
| 5,038,382 A | * | 8/1991 | Lipscomb | 382/189 |
| 5,825,906 A | * | 10/1998 | Obata et al. | 382/119 |
| 5,828,772 A | * | 10/1998 | Kashi et al. | 382/119 |
| 5,835,632 A | * | 11/1998 | Takasu et al. | 382/185 |
| 6,118,889 A | | 9/2000 | Izuno et al. | 382/119 |

FOREIGN PATENT DOCUMENTS

| | | |
|---|---|---|
| JP | 5-324805 | 12/1993 |
| JP | 6-309465 | 11/1994 |
| JP | 7-37095 | 2/1995 |
| JP | 10-40388 | 2/1998 |
| JP | 10-171926 | 6/1998 |

OTHER PUBLICATIONS

"Dynamic Programming Methods II" T. Yong, et al. Handbook of Pattern Recognition and Image Processsing, Academic Press, 1996, pps. 501-509.

"A Treatise on the Differential Geometry of Curves and Surfaces" L. Eisenhart, Ginn and Company, 1909, pps. 16-17.

Geometry, Topology and Physics: M. Nakahara, Institute of Physics, 1990, pps. 130-185 and 204-264.

* cited by examiner

--PRIOR ART--

--PRIOR ART--

--PRIOR ART--

--PRIOR ART--

--PRIOR ART--

--PRIOR ART--

--PRIOR ART--

--PRIOR ART--

--PRIOR ART--
F I G. 22
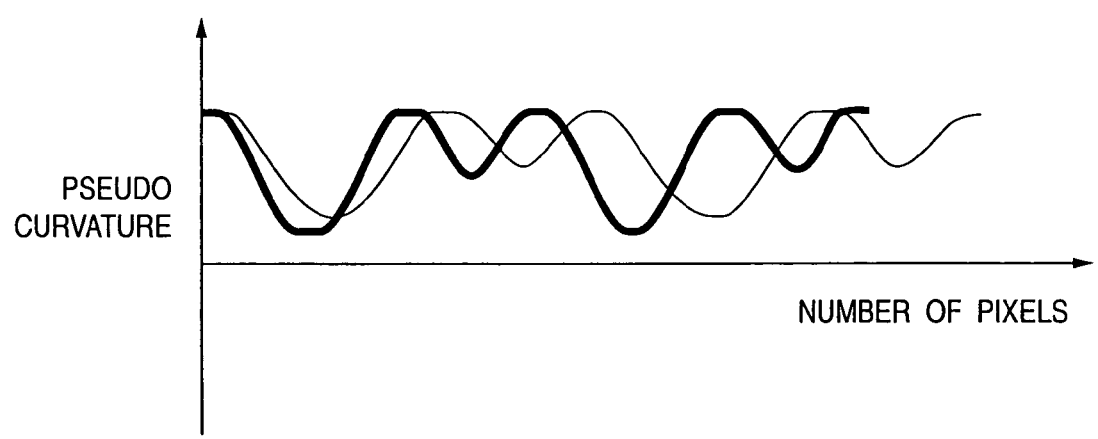

INFORMATION PROCESSING METHOD AND APPARATUS

FIELD OF THE INVENTION

The present invention relates to an information processing apparatus and method and, more particularly, to a technique suitable for personal verification based on a handwritten pattern by a pattern matching process.

BACKGROUND OF THE INVENTION

Personal verification using a handwritten signature forms a signature verification culture centering around the West. On the other hand, the digital information society requires building a similar verification system. To meet such requirements, for example, Japanese Patent Laid-Open Nos. 10-171926, 10-40388, and 5-324805 have proposed signature verification systems. The signature verification systems described in these references will be described below.

The technique described in the references will be described with reference to FIG. 14. A person signs on an input device 3021 such as a digitizer or the like using a digital pen 3022. As for the input signature, the position coordinates (xin, yin) and handwriting pressure pin of the digital pen are read at unit time intervals, they are converted into an electrical signal as time-series data, and the electrical signal is sent to a data controller 3023. The data controller 3023 compares the input data with a standard pattern serving as an evaluation reference to check if the input signature is an original one.

As a method of detecting the difference between the standard pattern and input pattern, a fuzzy scheme (Japanese Patent Laid-Open No. 5-324805) and a dynamic programming method (Japanese Patent Laid-Open Nos. 10-171926 and 10-40388) are used in the above proposals.

The dynamic programming method is described in T. Y. Yong & K-S. Fu, co-editors, "Handbook of Pattern Recognition and Image Processing", Academic Press, 1986.

Both these methods require pattern matching between time-series data of x- and y-coordinate values as discretized Cartesian coordinates obtained by the signature, and time-series data of standard x- and y-coordinate values, and weighting associated with the handwriting pressure or the velocity of time-series data.

On the other hand, a curve that allows a finite number of intersections, as shown in FIG. 15, is called a curve immersed in a two-dimensional plane in mathematics. Signature data can be recognized as a curve immersed in a two-dimensional plane.

Since signature characters run on or are simplified extremely, it is advisable to consider them as a symbol or geometric curve rather than characters. In practice, since personal authentication has been implemented so far based on such extremely modified characters, a recognition method of handwritten characters as normal characters is limited. Therefore, the present application recognizes signature characters based on classification of curves, i.e., the signature verification program is replaced by the problem of similarity or congruence of curve figures. For this reason, a curve obtained from the signature will be referred to as a signature curve hereinafter.

From such point of view, the conventional signature verification technique that uses discretized Cartesian coordinates suffers the same problem as in a classification method of curves using x- and y-coordinates, as will be described below, and such problem hinders verification.

As the inventions of a method of classifying curve shapes, a series of figure shape learning/recognition methods of Japanese Patent Laid-Open Nos. 5-197812, 6-309465, and 7-37095 are known. The inventions described in these Laid-Open publications will be described below as the prior art.

Assume that a dot sequence is given by $\{d[i]|i=1,\ldots,N\}$. Note that d[i] is a two-dimensional vector quantity of an integer value, and the dot sequence is a two-dimensional lattice coordinate sequence of d[i]=(x[i], y[i]). For the sake of simplicity, assume that the dot sequence is closed, and number i is that of modulo N. Hence, d[i modulo N]. Also, the dot sequence has an order along connectivity of a curve, and none of a hair stroke (FIG. 16A), a bent curve more than a resolution (FIG. 16B), double lines (FIG. 16C), and an intersection (FIG. 16D) are present as a thin-line-converted curve for the sake of simplicity. Note that an actual signature curve is numbered time-serially, and traces indicated by blank curves can be reproduced within the range of the dot resolution, thus posing no problem. However, in this case, the aforementioned assumptions were set for the sake of simplicity.

A "curvature" in Japanese Patent Laid-Open Nos. 5-197812, 6-309465, and 7-37095 will be defined. As is professed in Japanese Patent Laid-Open No. 6-309465, a "curvature" that the inventor of this application called is not a curvature in the mathematical sense. In practice, this definition does not give correct information since it conflicts with the argument of congruence of figures, as will be explained later. Hence, in this specification, the curvature defined in the above references will be referred to as a pseudo curvature.

FIGS. 17A to 17C are views for explaining the definition of the pseudo curvature in the prior art. A pair of dots (d[i−k], d[i+k]) (two-dimensional vector) will be examined for pixel d[i]. A perpendicular is dropped from d[i] to a line segment defined by (d[i−k], d[i+k]), and its height is represented by B[k]. Also, the length of the line segment defined by (d[i−k], d[i+k]) is represented by L[i,k]. k assumes natural numbers 1, 2, 3, . . . in turn, and B[k] is calculated for each k. For given parameter E, maximum k is obtained within the range B[k]<E.

At this time, two different pseudo curvatures are defined as follows in accordance with FIGS. 17A to 17C.

1. First pseudo curvature (Japanese Patent Laid-Open No. 5-197812): Angle $\theta[i]$ vector (d[i+k], d[i]) makes with vector (d[i−k], d[i]) is defined as the first pseudo curvature. $\{(i, \theta[i], |i=1,\ldots, N\}$ as the distribution function of each pixel number i is called a first pseudo curvature function.

2. Second pseudo curvature (Japanese Patent Laid-Open Nos. 6-309465 and 7-17095): A circle defined by three points (d[i+k], d[i], d[i−k]) on a curve is determined, and if R[i] represents the radius of that circle, 1/R[i] is defined as the second pseudo curvature. $\{(i, 1/R[i]) |i=1,\ldots, N\}$ as the distribution function of each pixel number i is called a second pseudo curvature function.

The two pseudo curvatures defined as described above are not invariant with respect to affine (congruence) transformation even by approximation, and a limit is often not present even at a limit at which zero pixel resolution is set. That is, these pseudo curvatures are not mathematically well-defined. For this reason, any obtained figures are not invariant with respect to affine transformation even by approximation or the like and are indeterminate values. Japanese Patent Laid-Open Nos. 5-197812, 6-309465, and 7-37095 compensate for such mathematical drawbacks using a neural net.

An algorithm will be explained with reference to FIG. 18. In step SS1, a memory or the like is initialized. For example, a curve figure is converted into thin-line data to remove patterns shown in FIGS. 16A to 16D. In step SS2, the first or second pseudo curvatures of the curve are computed to calculate a pseudo curvature distribution. In step SS3, the obtained pseudo curvature distribution is processed using a neural net to classify the curve.

As will be described later, the aforementioned pseudo curvature is mathematically unstable and, hence, a learnable process such as the neural net or the like must be done as in step SS3. This is an important fact. According to the present invention to be described later, since no such mathematical drawbacks are present, the curve figure can be classified using a classic logical circuit.

As is known, classification of a curve immersed in a two-dimensional plane can be defined by a Frenet-Serret's formula. (For example, refer to L. P. Eisenhart, "A Treatise on the Differential Geometry of Curves and Surfaces", Ginn and Company 1909.) Let $\phi$ be the adjacent angle with respect to a curve, and s be the length of the curve (arc length) determined by a natural measure on the two-dimensional plane, as shown in FIG. 19. Then, the following formula can be defined:

$$\begin{pmatrix} \frac{d}{ds} & k \\ -k & \frac{d}{ds} \end{pmatrix} \begin{pmatrix} \cos(\phi(s)) \\ \sin(\phi(s)) \end{pmatrix} = 0 \quad (1)$$

Note that $k=d\phi/ds$ is a curvature, and $1/k$ is a so-called radius of curvature. This formula is called the Frenet-Serret's formula, and classic differential geometry teaches that the local natures of a curve are perfectly determined by this formula.

Note that the curvature k in the theory of curves in classic differential geometry is an extrinsic curvature, and is a kind of connection according to the terminology of modern differential geometry. The curvature k is defined on one dimension, and does not have any direct relation with an intrinsic curvature called a curvature tensor which does not assume any value on two or more dimensions. Note that the terminology of modern differential geometry is described in, e.g., M. Nakahara, "Geometry, Topology and Physics", Institute of Physics 1990. Also, the intrinsic and extrinsic curvatures are related by "Gauss' surprise theorem" in case of a two-dimensional surface.

Upon adopting notation which is independent of coordinates, a curvature in classic differential geometry is $\kappa=kds$. This is a differential form of order one, or one-form, in the terminology of modern differential geometry.

As is well known, the relationship between one form (distribution function) and function (scalar function) is determined by transformability with respect to coordinate transformation. That is, upon coordinate transformation of the arc length s into an infinitely-differentiable function g(s) that monotonously increases with s, the (scalar) function is $f(s)=f(g(s))$. On the other hand, one-form (or distribution function) is transformed into $f(s)ds=f(g(s))(ds/dg)dg$. Note that (ds/dg) means the Jacobian.

Therefore, the curvature is a distribution function that must consider the Jacobian with respect to coordinate transformation, and upon coordinate transformation of the arc length s into the function g(s) that monotonously increases with s, a curvature k(s) must be transformed into (k(g(s)) (ds/dg) to obtain a mathematically significant result.

However, the pseudo curvatures defined in Japanese Patent Laid-Open Nos. 5-197812, 6-309465, and 7-37095 do not consider the Jacobian in coordinate transformation from the arc length into the number of pixels. In practice, transformation from a line segment into two-dimensional image data is arbitrary, and the number of dots that express an identical line segment is not constant with respect to the length of the line segment, as shown in FIGS. 20A and 20B. That is, the number of dots can be considered as a function of the arc length, and when a distribution function like a curvature in classic differential geometry is expressed by the number of dots, that expression itself must be considered as coordinate transformation from the arc length. Especially, two-dimensional image data does not normally have any degree of freedom in rotation, and no degrees of freedom in translation less than the pixel size are present. That is, the number of dots along the arc is a function which changes with respect to the arc length s as coordinates along the arc, and when the curvature as one form (distribution function) is expressed, it is important to give information which indicates a coordinate system of integer values discretized by the Jacobian.

However, the pseudo curvatures described in the prior art do not take such consideration.

Affine transformation will be explained below. In the field of mathematics, congruence transformation has been studied in the field of affine geometry, and a congruence condition between figures defined on a two-dimensional plane purely means that two figures perfectly overlap each other after appropriate equivalent affine transformation (translation and rotation). Similarity includes enlargement/reduction transformation in this equivalent affine transformation. Such transformation is called affine transformation.

Therefore, as can be understood from the above description, signature verification is equivalent to similarity or congruence of curve figures in a pure sense. However, even for an identical person, signature curves obtained have different various conditions such as enlargement/reduction, translation, angular deviation, and the like upon every signature. Of these signature curves, a shape invariant to the aforementioned affine transformation is present, and a signature fluctuates naturally.

For this reason, it is important that the processing algorithm has no conflict with affine transformation so as to minimize verification process errors upon verification.

However, the conventional signature handwriting analysis method and apparatus (Japanese Patent Laid-Open Nos. 10-171926, 10-40388, and 5-324805) are not invariant with respect to such affine transformation, as will be described below, since pattern matching using discretized Cartesian coordinates is done, thus posing various problems.

Furthermore, it is very difficult to match two curve figures upon excluding the degree of freedom in affine transformation when a figure described as an actually drawn curve is involved. A "line" on the digitizer has a width, and is not mathematically a strict line. That is, the input device 3021 such as the digitizer or the like in FIG. 14 has a resolution determined by hardware, and when a curve figure is expressed as two-dimensional image data, as shown in FIGS. 20A and 20B, the figure strongly depends on its expression method due to quantization errors.

However, this dependence is very small since a curve figure seems to express a strict figure for the human eye when the curve figure is sufficiently larger than the pixel size of image data. Under such illusion, we normally handle image data.

But if such sense of understanding is directly applied to mathematical quantities (e.g., the pseudo curvatures, and information of lattice data determined by Cartesian coordinates upon evaluating similarity in this case), and definition is made without any mathematical strictness, we lose logic and rationality.

In order to define a difference/similarity between given objects A and B in mathematics, topology must be introduced. In the current problems, comparison must be made by introducing a kind of topology. At this time, topology must be weak enough to solve the problem that the actual "line" has a width, and problems of quantization errors, discretization errors, and the like such as curvatures, and the like. If identity (congruence) of figures is to be discriminated finally, an algorithm must be invariant or approximately invariant with respect to affine transformation.

The pseudo curvatures in the prior art and the conventional signature verification method that processes using x- and y-coordinate sequences do not meet such requirements. For example, as can be immediately understood from FIGS. 21A and 21B, the pseudo curvatures formed in the prior art are not invariant with respect to affine transformation and, especially, rotation.

As shown in FIG. 21A, when straight lines which form a line figure agree with the pixel lattices, the number of dots and arc length are linked via linear transformation having a magnification-multiple correspondence. However, when straight lines are oblique, as shown in FIG. 21B, pixels which express these lines form jaggies, and the ratio of the number of pixels required for expression and length is not constant. In practice, in order to express a straight line of approximately $\sqrt{2}$ (pixels) having an angle of 45°, as shown in FIG. 21B, three pixels are required, and the number of pixels becomes about twice larger than the length. As shown in FIGS. 20A and 20B, a smallest angular difference often abruptly changes the number of pixels required to express a line segment.

By reflecting this fact, the graph of pseudo curvature distribution functions (either the first or second pseudo curvatures) in FIGS. 21A and 21B is as shown in FIG. 22. In FIG. 22, the abscissa plots the number of pixels, and the ordinate plots the pseudo curvature. The bold curve indicates a case wherein the straight lines agree with the pixel direction, as shown in FIG. 21A, and the thin curve indicates a case herein the straight line is oblique, as shown in FIG. 21B. The appearance of the pseudo curvature function largely changes with respect to transformation, i.e., rotation.

Conversely, by changing the direction of rotation or the like with respect to a graph that plots the same number of pixels and pseudo curvatures, different figures are recognized as identical figures.

To correct such contradictions, the prior art (Japanese Patent Laid-Open Nos. 10-171926, 10-40388, and 5-324905) adopts a correction method using a neural net. However, it is generally difficult to reproduce mathematically rational information from information which is not mathematically well-defined.

In Japanese Patent Laid-Open Nos. 5-324805, 10-171926, and 10-40388, correction based on a fuzzy scheme or dynamic programming scheme is done. However, these errors include correction components resulting from information which is not mathematically well-defined, thus impairing the reliability of signature verification.

SUMMARY OF THE INVENTION

The present invention has been made in consideration of the conventional problems, and has as its object to implement more accurate pattern matching of a handwritten input, which is approximately invariant to affine transformation, and can reduce the influence of discretization errors.

According to the present invention, the foregoing object is attained by providing an information processing apparatus comprising: acquisition means for acquiring an input coordinate sequence generated by sampling a handwritten input pattern at predetermined intervals; line segment conversion means for converting a pattern expressed by the input coordinate sequence into line segments by approximating the pattern by coupling a plurality of line segments; generation means for generating angle distribution data on the basis of directions of the line segments obtained by said line segment conversion means; and matching means for executing a matching process of a pattern on the basis of the angle distribution data generated by said generation means.

According to another aspect of the present invention, the foregoing object is attained by providing an information processing method comprising: the acquisition step of acquiring an input coordinate sequence generated by sampling a handwritten input pattern at predetermined intervals; the line segment conversion step of converting a pattern expressed by the input coordinate sequence into line segments by approximating the pattern by coupling a plurality of line segments; the generation step of generating angle distribution data on the basis of directions of the line segments obtained in the line segment conversion step; and the matching step of executing a matching process of a pattern on the basis of the angle distribution data generated in the generation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is a view for explaining the conventional problems.

DETAILED DESCRIPTION OF THE
PREFERRED EMBODIMENTS

Preferred embodiments of the present invention will now be described in detail in accordance with the accompanying drawings.

<First Embodiment>

An outline of the process of the first embodiment will be explained first. In this embodiment, a signature verification apparatus and method, which verify a signature by extracting a geometric feature of an input signature pattern, converting the feature into numerical value data, and comparing the numerical value data with a standard numerical value sequence prepared in advance will be described.

Figure 1:
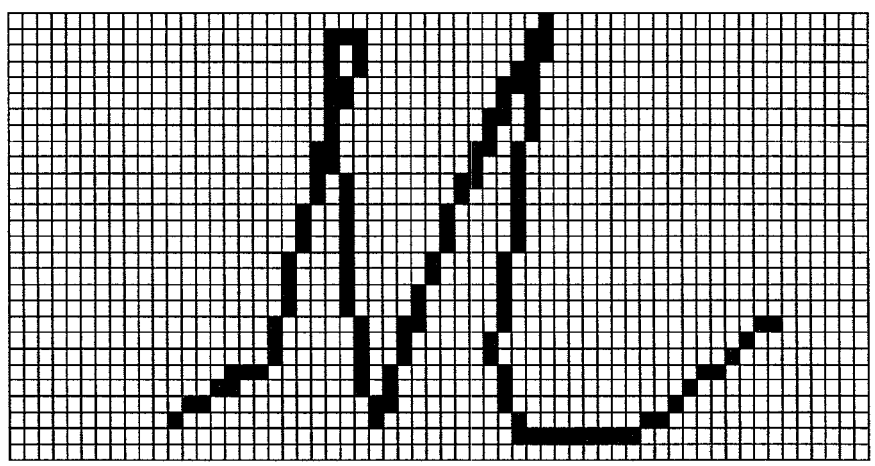
FIG. 1 shows an example of dot sequences after a handwritten signature to be processed in this embodiment is converted into digital data by a digitizer.

FIG. 1 shows an example of dot sequences after a handwritten signature to be processed in this embodiment is converted into digital data by a digitizer. As shown in FIG. 1, the digitizer converts a signature written using a thin pen into N dot sequences $A=\{(x[i], y[i])|i=1, \ldots, N\}$ in a two-dimensional integer lattice.

Data used are captured at very small time intervals. At average intervals, two neighboring dot sequences are captured as a figure. In this case, some dot sequences may overlap at a single pixel position when the capture speed is low.

Figure 2A:
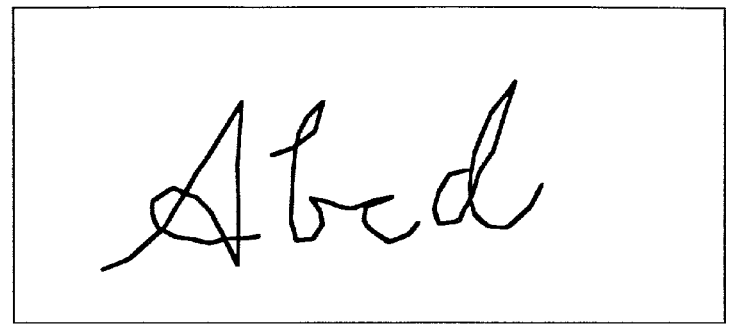
FIGS. 2A to 2D are explanatory views of dot sequences in processes of this embodiment for a signature.
Figure 2B:
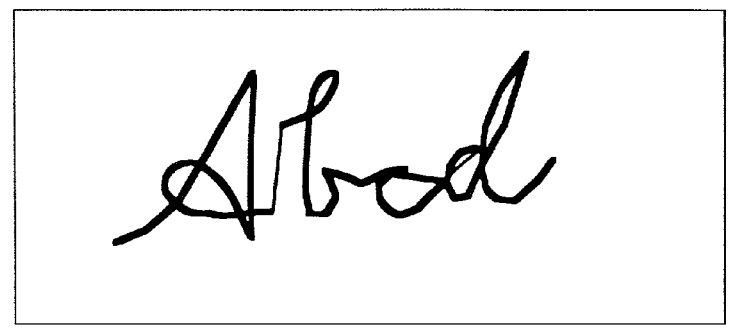

Furthermore, even a portion which is not written by one stroke is adopted as a clot sequence that forms time-series data. FIGS. 2A to 2D are explanatory views of dot sequences in processes for the signature of this embodiment. That is, signature characters are generally considered as sets of curves which are not connected except for intersections, as shown in FIG. 2A. Signature characters to be defined in this embodiment adopt a curve which is written by one stroke (FIG. 2B) along an elapse of time even for portions which are not connected. As shown in FIG. 2B, a portion between strokes is interpolated by a straight line to write characters by one stroke. The adopted curve will be referred to as a signature curve hereinafter.

Figure 3A:
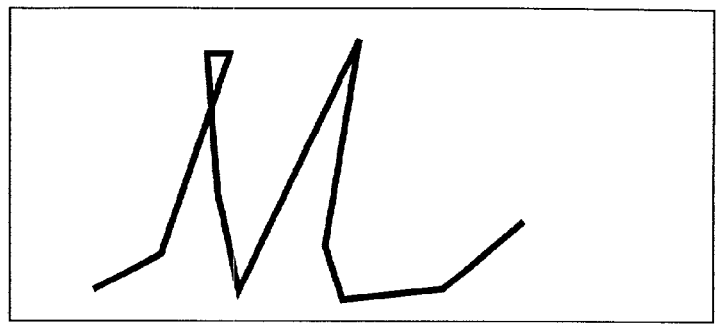
FIGS. 3A to 3D are views for explaining a process of the first embodiment for input data shown in FIG. 1.

As transformation which considers the fact that an original figure and a figure expressed by two-dimensional pixels match at a modulo pixel resolution, information not more than a pixel resolution in a divisional line segment figure shown in FIG. 3A is ignored to recover the original figure. A cutoff parameter that defines the limit resolution upon capture is used, and transformation into a divisional line segment figure is made, as will be described later with reference to FIGS. 9A to 9D. Since the original figure is defined by dot sequences A, it can be defined as a figure which is approximately invariant to affine transformation. This figure is converted into line segment sequence B, as will be described in detail later. The line segment sequence B is obtained by appropriately decimating data of the dot sequences A.

Since the arc length can be well-defined in the divisional line segment figure, an angle function $\Phi(s)$ of an adjacent angle with respect to the arc length s and the like can be well-defined. Hence, after the total arc length of the obtained line segment sequence data is calculated, the total arc length is divided by a given natural number M to form a dot sequence $\{s(i)\}$ which has an equal width with respect to the arc length. In this way, the arc length is normalized; data which is invariant to similarity transformation is handled.

Since the adjacent angle $\phi$ is one defined with respect to the coordinate axis (the horizontal axis of the input coordinate surface in this embodiment), it is not invariant to the degree of freedom in rotation of affine rotation. Hence, this angle is converted into a relative value unique to a figure so as to become invariant. More specifically, as a reference angle of adjacent angle $\phi[i]$ with respect to each dot s[i], the slope of a line segment which connects the start point to the end point of the dot sequence is defined to have zero angle. At this time, writing pressure time-series data of a pen upon signing, or time data from the signature start time at a vertex is converted into an arc length, if necessary.

In the above procedure, a dot sequence is converted into a line segment sequence, and time-series data can be converted into geometric data, i.e., an arc length. When the coordinate dot sequences A are given, as shown in FIG. 1, the next problem is to classify its shape.

Figure 4:
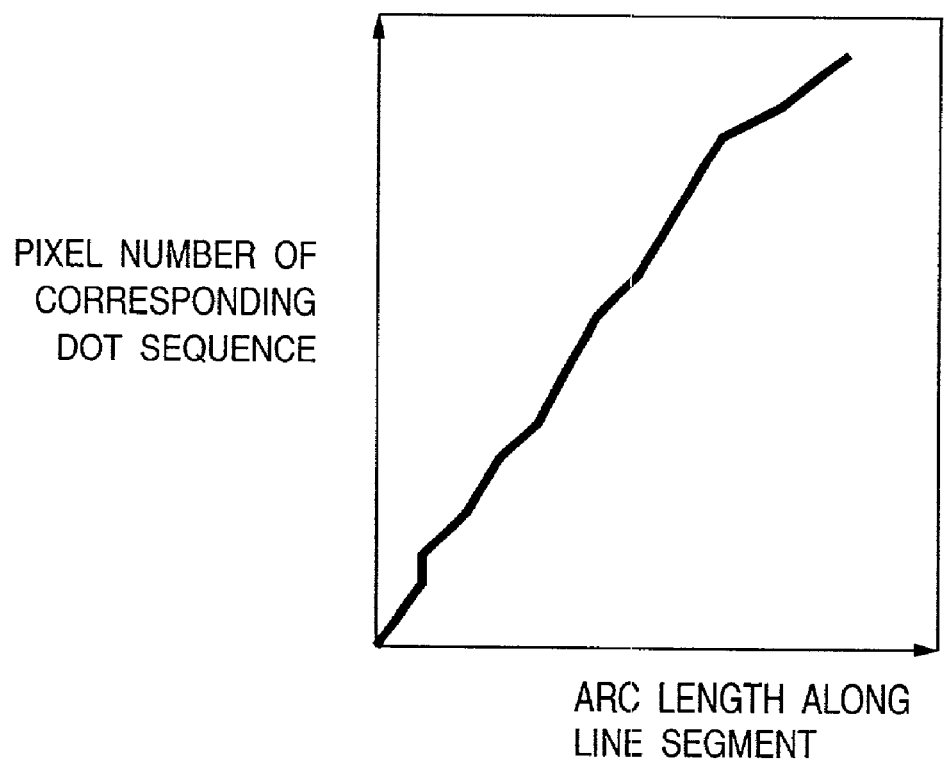
FIG. 4 is a graph showing the correspondence between the arc length along a line segment and the number of point sequences corresponding to the line segment.

Note that the effect of the Jacobian pointed out in the prior art need not be considered in the divisional line segment figure. That is, assume that a divisional line segment figure shown in FIG. 3A is given with respect to the dot sequences shown in FIG. 1, and corresponding points on the line segments are given for dots on the dot sequences. In this case, upon tracing the line segment sequence from a given start point on the line segment sequence, the correspondence between the corresponding line segment and the number of dot sequences present therein is as shown in FIG. 4. As can be seen from FIG. 4, the graph is not defined by a straight line. Therefore, if pixel numbers are used as arguments of curvatures, the Jacobian must be taken into consideration.

Figure 3B:
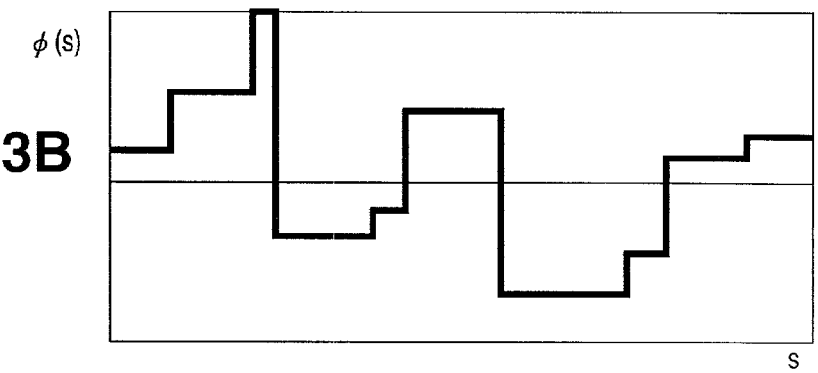

If the abscissa plots the arc length and the ordinate plots the angle of the corresponding portion, as shown in FIG. 3B, a feature of the figure can be expressed as a step (Heaviside) function. At this time, the adjacent angle $\phi$ has a degree of freedom in translation in modulo $2\pi$. This means a degree of freedom in position of zero angle upon measuring the adjacent angle, and it corresponds to a degree of freedom in rotation in affine transformation. In this embodiment, as the reference angle of zero angle, the direction of a straight line that connects the start and end points of the signature curve is adopted.

Figure 3C:
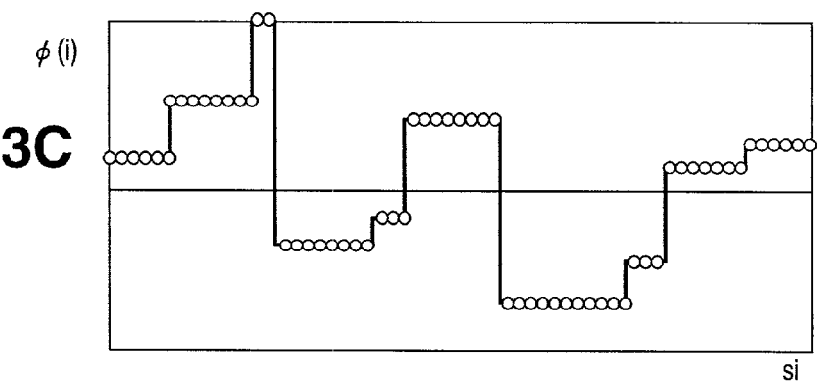
Figure 3D:
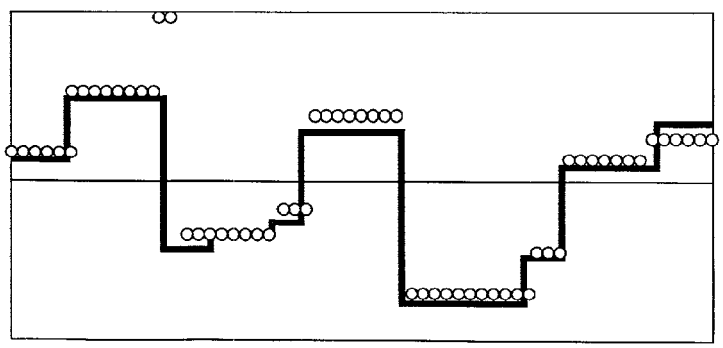
Figure 3E:
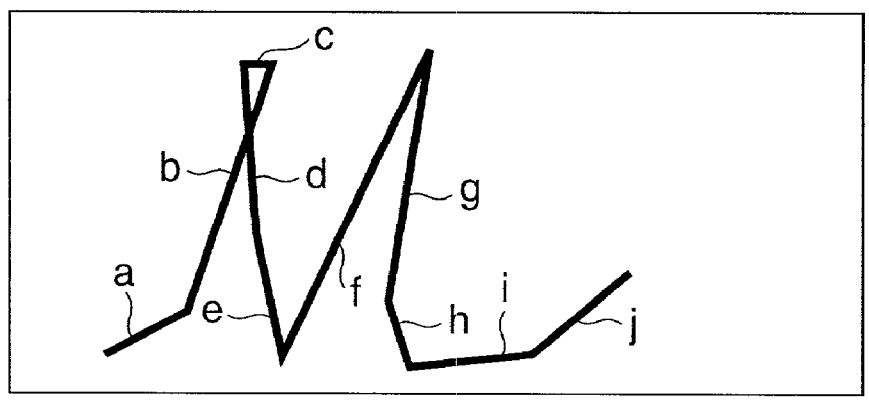
FIGS. 3E and 3F are views for explaining an adjacent angle distribution shown in FIG. 3A.
Figure 3F:
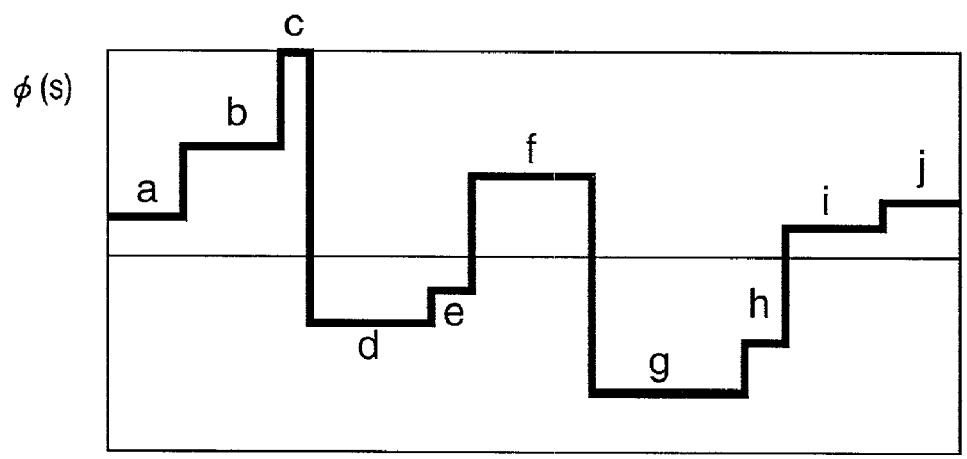

As shown in FIGS. 3E and 3F, the adjacent angles of line segments a to j are obtained to have a parallel line as zero angle, and the adjacent angle distribution shown in FIG. 3B is obtained as a step function having lengths according to the arc lengths of these line segments.

FIG. 3B expresses a continuous correspondence. However, on a computer, a figure is equally segmented along the arc length into sizes approximately equal to or larger than one pixel length, and the angle distribution on segmented one-dimensional lattice points on the arc is calculated to check the correspondence, as shown in the graph of FIG. 3C. The discretized angle distribution is expressed by $\phi[i]$. Note that the total number of divisions is a constant value.

The average value of $\phi[i]$ of about 10 signatures is calculated as a standard angle distribution, which is pre-stored in the storage device of the verification apparatus or is acquired via an IC card or computer network and is stored in a memory in the verification apparatus. The standard angle distribution present in the memory is compared with a standard angle distribution directly calculated from the input data, as described above to identify a given person.

That is, the signature verification apparatus of this embodiment performs pattern matching that adopts a normal pattern matching method or dynamic programming method, using information of the standard angle distribution and the like to compare with a standard signature curve, thus evaluating equivalence of a signature.

The signature verification apparatus according to the first embodiment will be described in more detail below.

Figure 5:
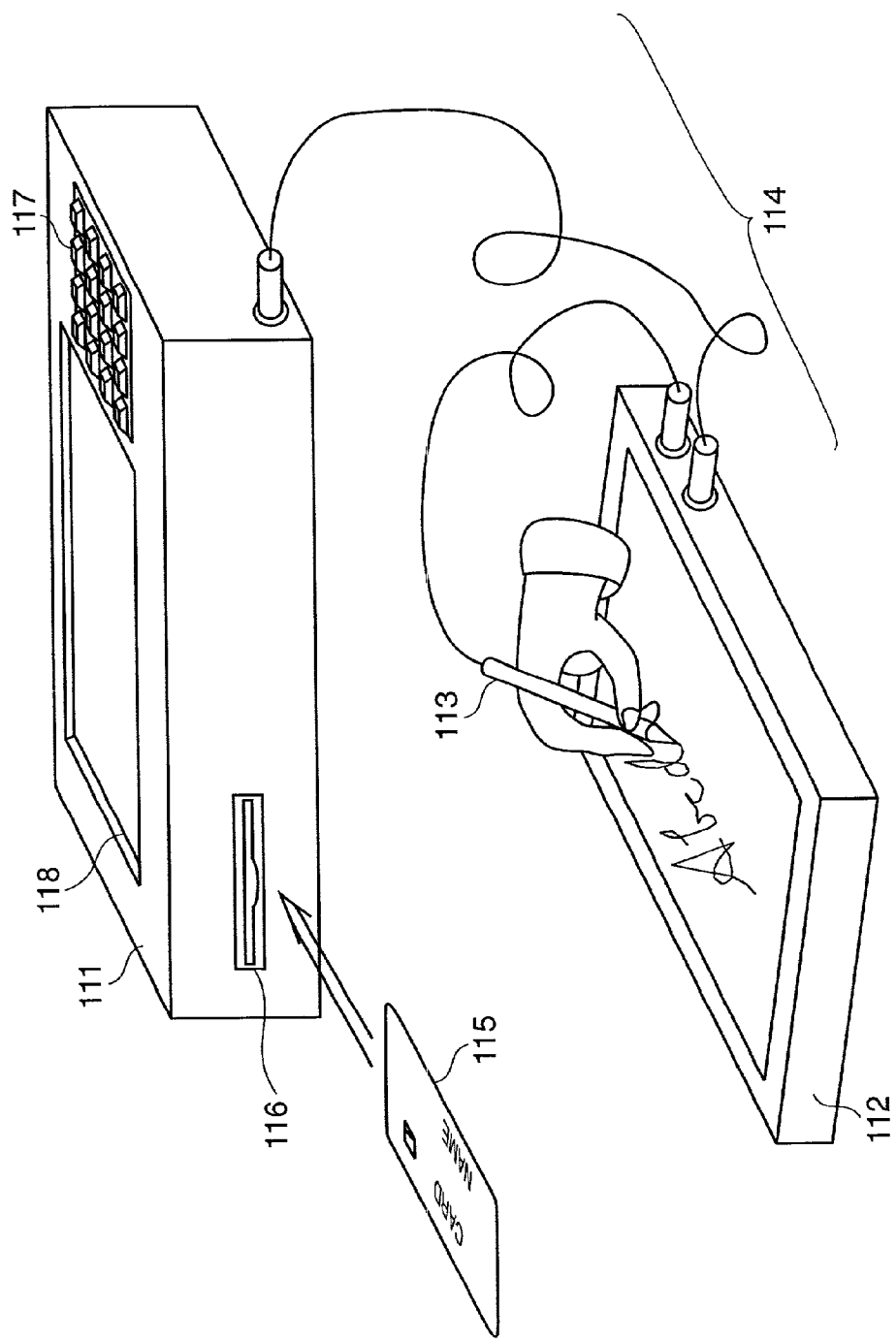
FIG. 5 is a perspective view showing the outer appearance of a signature verification apparatus according to this embodiment.
Figure 6:
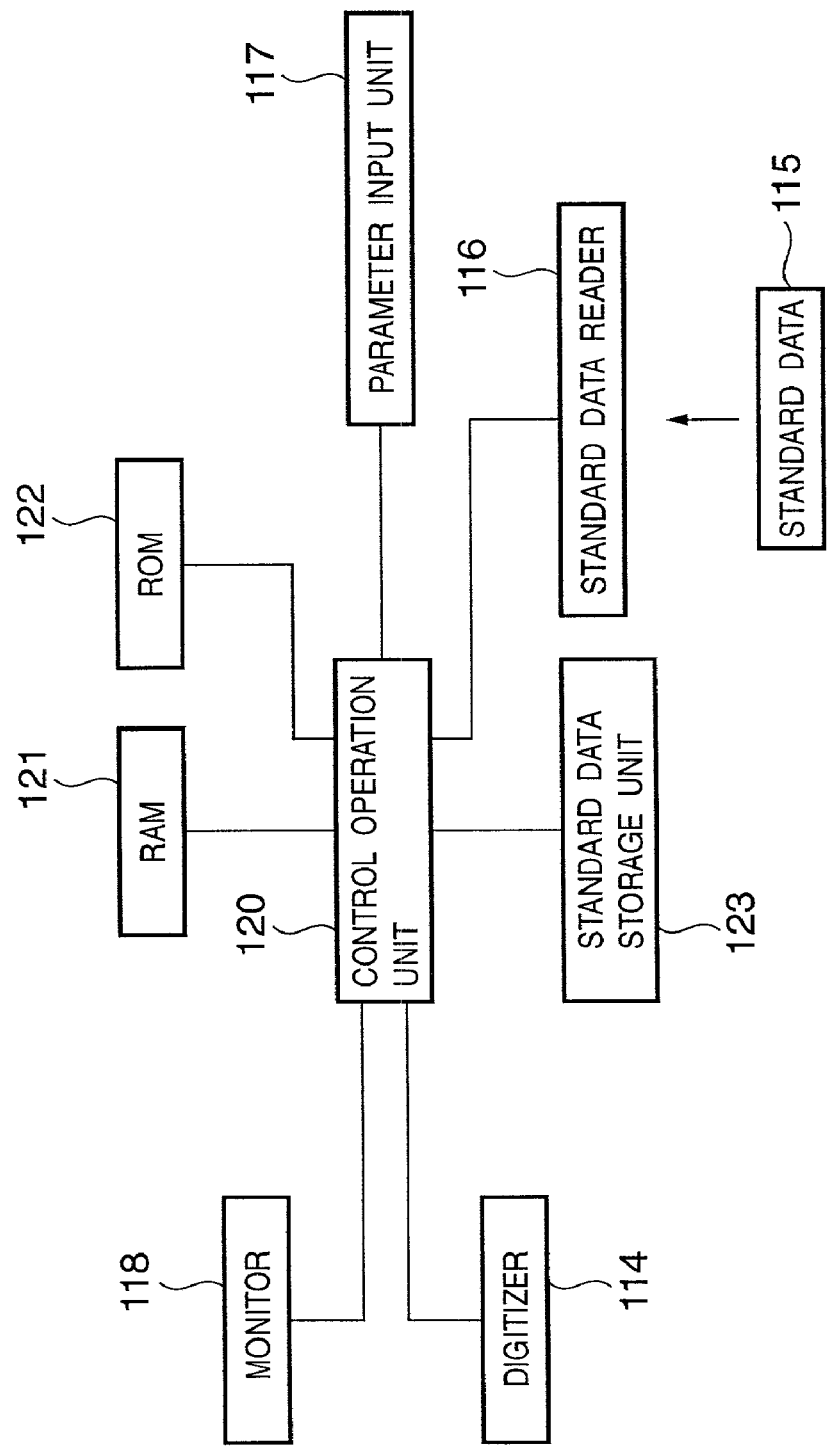
FIG. 6 is a block diagram showing the device arrangement of the signature verification apparatus shown in FIG. 5.

FIG. 5 shows the outer appearance of the signature verification apparatus according to this embodiment. As shown in FIG. 5, the signature verification apparatus comprises a main body 111, digitizer 114, and card 115. FIG. 6 is a block diagram showing the device arrangement of the signature verification apparatus shown in FIG. 5.

Referring to FIGS. 5 and 6, reference numeral 111 denotes a main body of the signature verification apparatus; and 114, a digitizer. The digitizer comprises an acute pen 113 and writing pad 112. The writing pad 112 comprises a sensor unit assembled in a two-dimensional matrix, and an A/D converter (not shown), and time-serially converts positions pressurized by the tip of the pen 113 into digital signals and sends them to the main body 111. The pen 113 is added with a function of detecting the writing pressure, and time-serially monitors the writing pressure and sends an analog signal to the writing pad 112. The A/D converter in the writing pad 112 converts the analog signal of the writing pressure into digital signals in synchronism with those of the pen positions and sends them to the main body 111.

Such device is called the digitizer 114 as a whole, and converts signature characters into time-series digital signals. That is, a pattern handwritten on the writing pad 112 is sampled at predetermined time intervals, and is acquired as an input coordinate sequence.

The main body 111 comprises a parameter input unit 117, a monitor 118 for displaying the control processes and input instructions of result parameters, a standard data reader 116 for reading standard data stored in a card or the like, a RAM 121, a ROM 122, a control operation unit 120, and a standard data storage unit 123. Note that the ROM 122 stores a control program for control to be described later with reference to the flow charts, and the control operation unit 120 executes the control program.

The object of this embodiment is to reconstruct signature characters from digital signals obtained upon signing on the digitizer, and to classify a curve by detecting the characters as the curve.

As described above, actual characters are formed of separated curves, as shown in FIG. 2A. However, since these characters are input time-serially, they can be detected as a curve written by one stroke, as shown in FIG. 2B, thus reducing the classification program of a single curve.

Figure 2C:
Figure 2D:
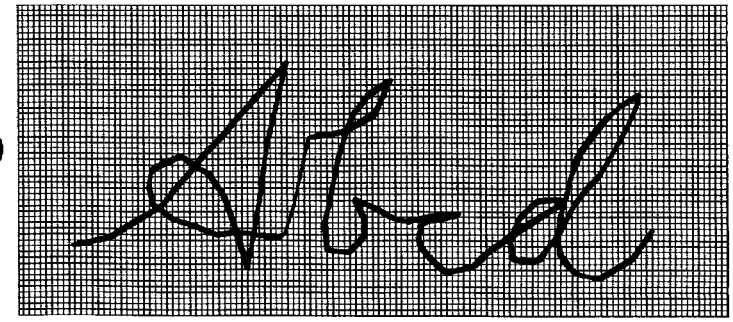

These line segments are time-series data on a two-dimensional lattice, as shown in FIG. 2C, and are reduced to N dot sequences $A=\{x[i], y[i]|i=1,\ldots,N\}$ in the two-dimensional integer lattice. i corresponds to an elapse of time. Also, the data used are captured at very small time intervals, so that the distance $|(x[i], y[i])-(x[i-1], y[i-1])|$ between neighboring dot sequences becomes one dot or less. In this case, some dot sequences may overlap at a single pixel position when the capture speed is low. The signature characters are generally considered as a group of curves which are not coupled except for intersections. However, a curve defined in this embodiment adopts that obtained by writing even non-coupled portions by one stroke along an elapse of time in practice. The adopted curve is called the signature curve, as described above.

When coordinate dot sequences A are given, as shown in FIG. 2C, the object of this embodiment is to classify its shape.

Upon writing on the digitizer, affine transformations such as skew, enlargement/reduction, translation, and the like, which are pointed out as the conventional problems, are ordinarily made. The object of this embodiment is to provide a signature verification method and apparatus which are invariant to such transformations. In practice, pattern matching using x- and y-coordinates suffers various problems and cannot find a match between data obtained in FIGS. 2C and 2D, as pointed out in the conventional problems, although one of these figures is only slightly slanted and larger than the other.

Figure 7A:
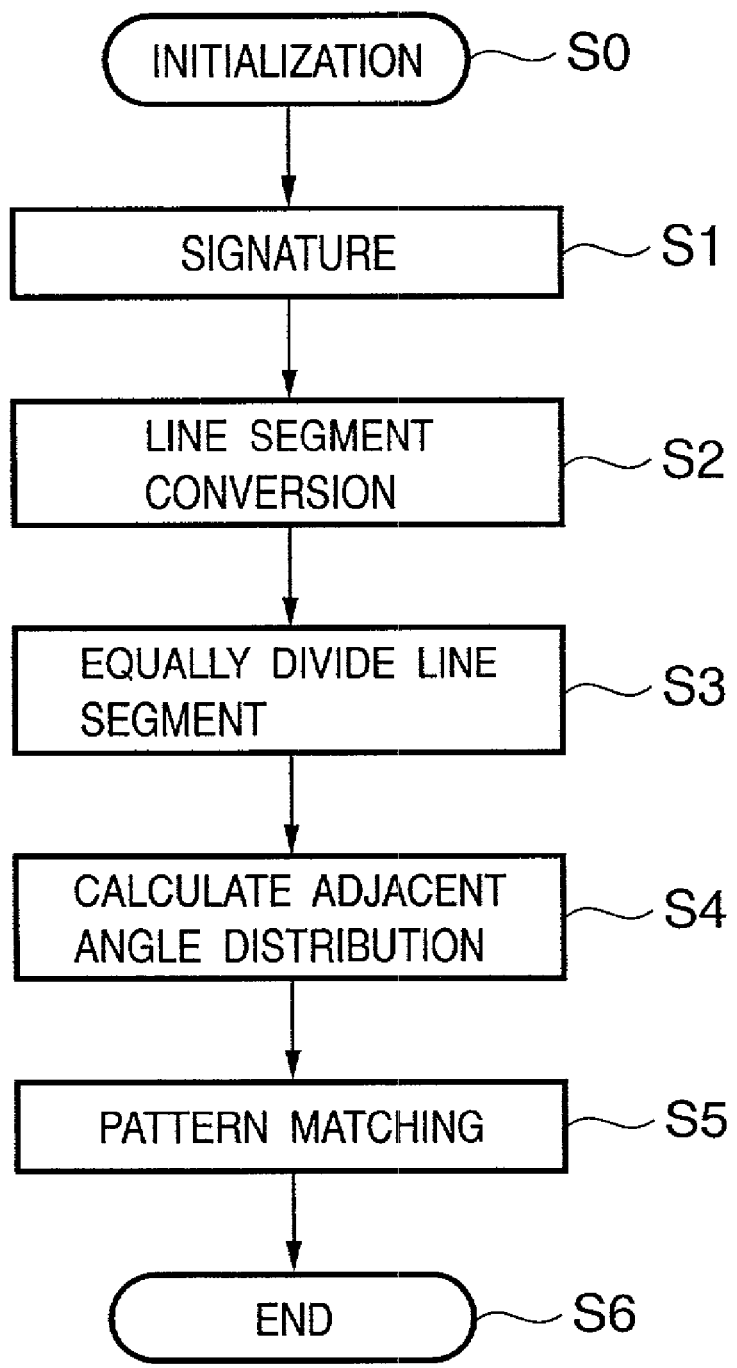
FIGS. 7A and 7B are flow charts showing the signature verification sequence in the signature verification apparatus of the first embodiment.

A rough flow of this embodiment will be described below with reference to the flow chart in FIG. 7A.

Initialization is done in step S0. In this initialization, standard data 115 obtained by reading an IC card or the like using the standard data reader 116 or standard data read out from the standard data storage unit 112 is loaded onto the RAM 121. At this time, the standard data storage unit 112 may be either an internal hard disk of the apparatus or a storage device such as a hard disk at a remote place, which stores data via a computer network.

In step S1, a person inputs a signature, which is converted into digital data by the digitizer, and the digital data is transferred to an arithmetic device. That is, a pattern written on the writing pad 112 using the pen 113 is sampled at predetermined time intervals, and is transferred as an input coordinate sequence to the arithmetic device. In step S2, dot data is converted into divisional line segment data. That is, the dot sequences shown in FIG. 1 are converted into line segment sequence data shown in FIG. 3A. The converted data are stored on the RAM 121 in FIG. 6.

With this conversion, errors upon converting into two-dimensional image data are reduced, and affine characteristics of the original figure are approximately recovered. Also, line segment conversion can define measures induced from natural measures of the two-dimensional plane on line segments, and the Jacobian problem described in the paragraphs of "background of the invention" can be disengaged.

The method adopted in line segment segmentation in step S2 will be explained below. This embodiment adopts the method described in Japanese Patent Laid-Open No. 1-295376.

A vertex sequence of a line segment sequence is expressed as a partial set B={(Vx[i], Vy[i])|i=1, . . . , R) of the coordinate dot sequence A. How to extract the partial set B from the dot sequence A is the line segment conversion problem of the dot sequences. Note that a threshold value vtxth0 is set in advance to be a constant value.

From the above assumption, it may be determined that the two ends of the corresponding curve of the coordinate dot sequence A are found. The line segment conversion process will be explained below with reference to the flow chart in FIG. 8 and examples shown in FIGS. 9A to 9D.

Figure 9A:
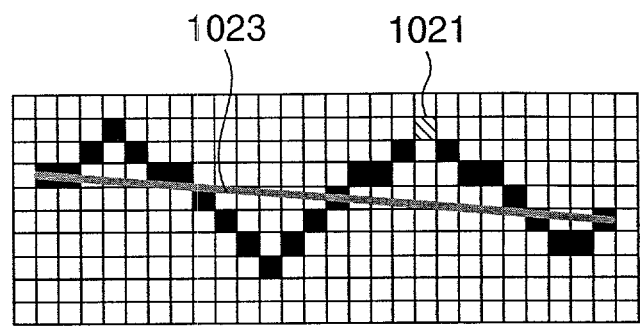
FIGS. 9A to 9D are views for explaining the line segment conversion process in the first embodiment.

An outline of the line segment conversion process will be described below with reference to FIGS. 9A to 9D. As shown in FIG. 9A, two ends of a pattern are connected by a line segment. This line segment is called a line segment of layer 1 (line segment 1023 in FIG. 9A). From this line segment, distances r[i] (i=1, . . . , N) to coordinate points (of the entire pattern at this time) in a region sandwiched between the two ends of the line segment are obtained. If a maximum one of the obtained distances r[i] is smaller than vtxth0, line segment conversion is not performed any more, and the line segment of layer 1 that connects the two ends is determined as a line segment sequence to be obtained.

Figure 9B:
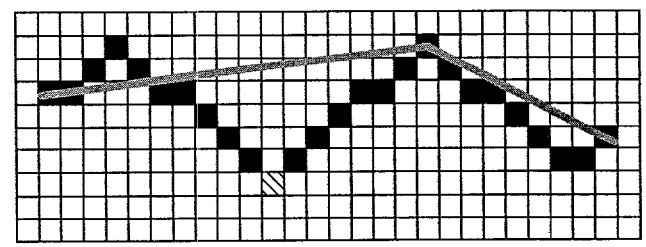

FIG. 9A shows a case wherein the maximum distance is larger than vtxth0, and a point 1021 has a maximum distance. In this case, the point 1021 is set as one of a new vertex sequence, as shown in FIG. 9B. In this way, a new layer is set, and the obtained dot sequence is defined as a vertex sequence of layer 2.

Such operation repeats itself on the respective line segments as follows. Assume that the current layer is K (>1). One line segment of the line segment sequence of layer K is selected as a line segment of interest. Distances r[i] (i=j1, . . . , j2) between the partial sequence of the coordinate dot sequence A in a region sandwiched between the two ends of that line segment, and the line segment of interest are obtained. If the maximum one of the distances (maximum distance d) is smaller than vtxth0, the line segment of interest is defined as a part of the line segment sequence to be obtained. At this time, it is determined that the corresponding line segment converges for layer K, and the corresponding portion of the line segment sequence remains unchanged even when the layer is incremented from K to K+1.

Figure 9C:
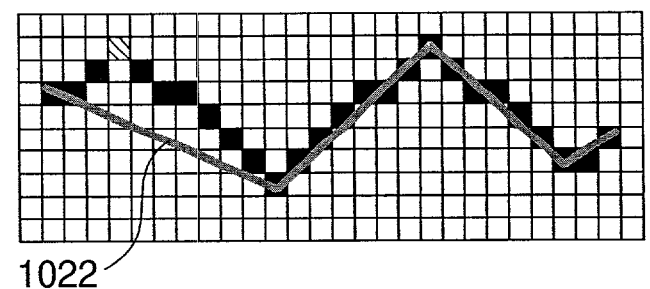

If the maximum distance d is larger than vtxth0, the point having the maximum value is set as one of a vertex sequence of next layer K+1. This operation is made for all line segments, which have not converged yet, on that layer, and the next layer (K+1) is selected after operations for all the line segments on layer K. For example, after one operation from FIG. 9A, the line segment in FIG. 9A is converted into two white line segments, as shown in FIG. 9B. When the above operation is performed for each of the two white line segments in FIG. 9B, line segments shown in FIG. 9C are obtained. When the line segments in FIG. 9C further undergo line segment conversion, the line segments other than a line segment 1022 converge in the above sense (i.e., the distances between the dot sequence belonging to that line segment, and the line segment do not exceed vtxth0), and only the line segment 1022 is further converted into line segments, as shown in FIG. 9D.

After the layer is sufficiently incremented by repeating the above operation, since the number of coordinate points is finite, all line segments converge, i.e., a line segment sequence can be formed so that all dot sequences have distances smaller than vtxth0 from the corresponding line segments.

Figure 8:
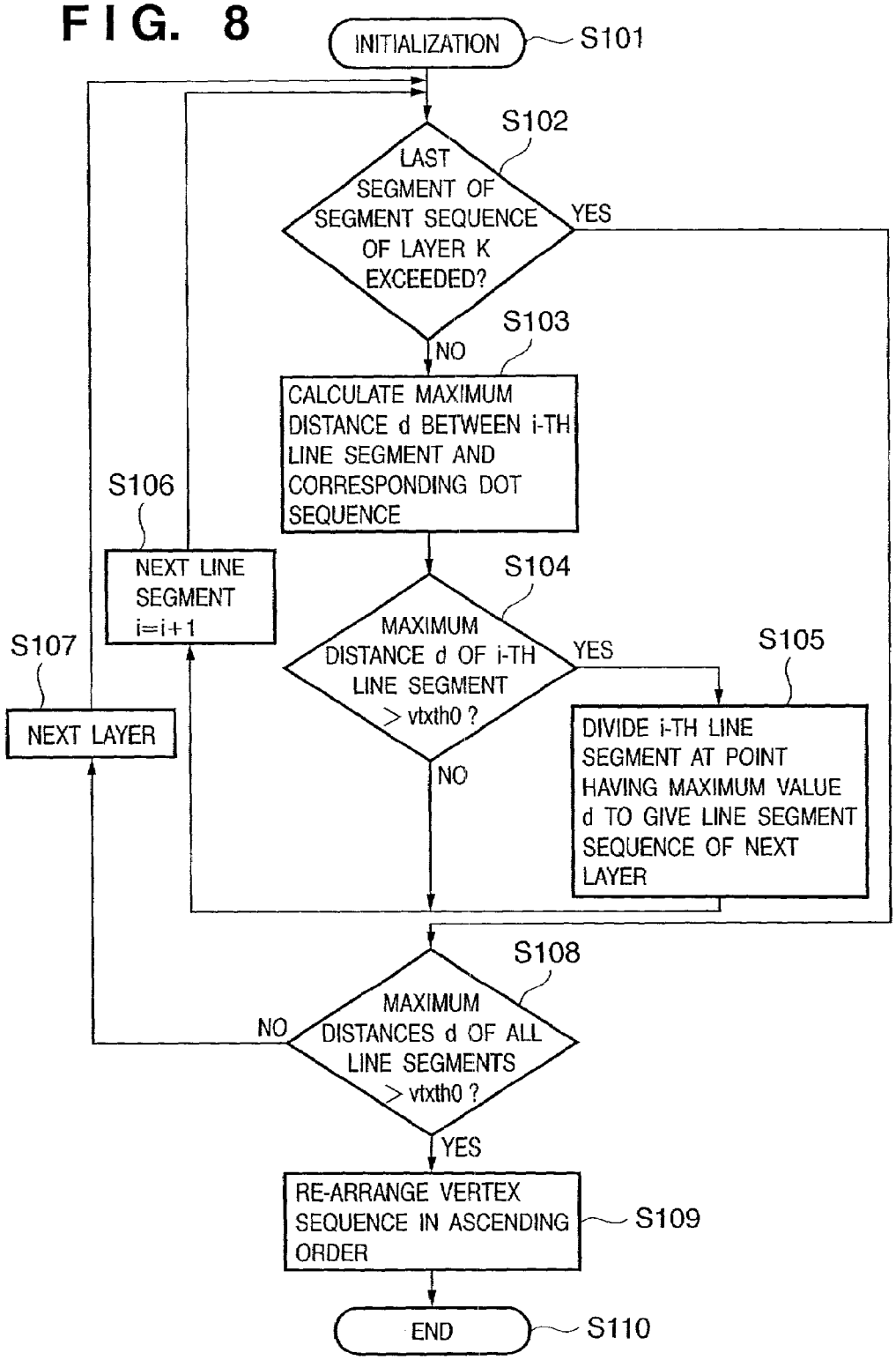
FIG. 8 is a flow chart for explaining the sequence of a line segment conversion process in the first embodiment.
Figure 9D:
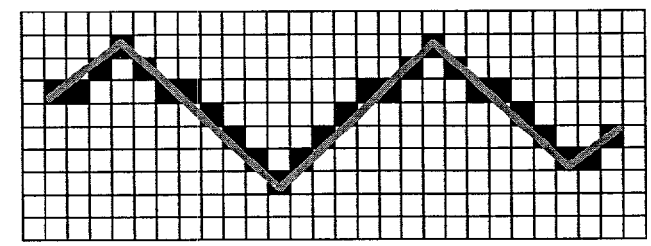

With the aforementioned method, a line segment sequence shown in FIG. 9D is obtained from FIG. 9A. FIG. 8 is a flow chart of the aforementioned process. The line segment conversion process for a general case will be explained below with reference to FIG. 8.

Initialization is done simultaneously with the beginning of step S101. That is, layer K is reset to "1", and the two ends of a curve are set as those of a line segment of layer 1. It is checked in step S102 if the i-th line segment of interest has exceeded the last line segment of a line segment sequence of layer K.

If NO in step S102, the maximum value of distances between corresponding coordinate points in the line segment and that line segment is calculated. If it is determined in step S104 that the maximum distance d of the line segment is larger than vtxth0, the flow advances to step S105 to divide the i-th line segment into two line segments at the point having the maximum distance d. If the maximum distance d of the line segment is smaller than vtxth0 in step S104, the process of the next line segment starts. That is, it is determined that the line segment of interest converges.

In step S106, the next line segment of the line segment sequence in layer K is selected. It is checked in step S102 again if the i-th line segment of interest has exceeded the last line segment of the line segment sequence of layer K. The operations in steps S103 to S106 are repeated up to the last line segment of the line segment sequence of layer K.

If it is determined in step S108 that the maximum distance d in all line segments is smaller than vtxth0, the selected vertex sequences (x(i$_a$) y(i$_a$)) of the line segment sequence are rearranged in ascending order of i$_a$ to obtain a vertex sequence of line segments in step S109. After that, the flow advances to step S110 to end the process. On the other hand, if it is determined in step S108 that all line segments have not converged yet, the next layer is selected in step S107, and the flow returns to step S102. By repeating the above process, all line segments finally converge, and the processing ends.

In the above process, vtxth0 can be used as a parameter for determining a resolution, thus rationally changing the resolution. The parameter can be input/changed using the parameter input unit 117 in FIG. 11.

The line segment sequence obtained in this way approximates the original figure, as described above, and the degree of freedom in affine transformation which is lost upon conversion into two-dimensional image data can be approximately obtained again.

Figure 10B:
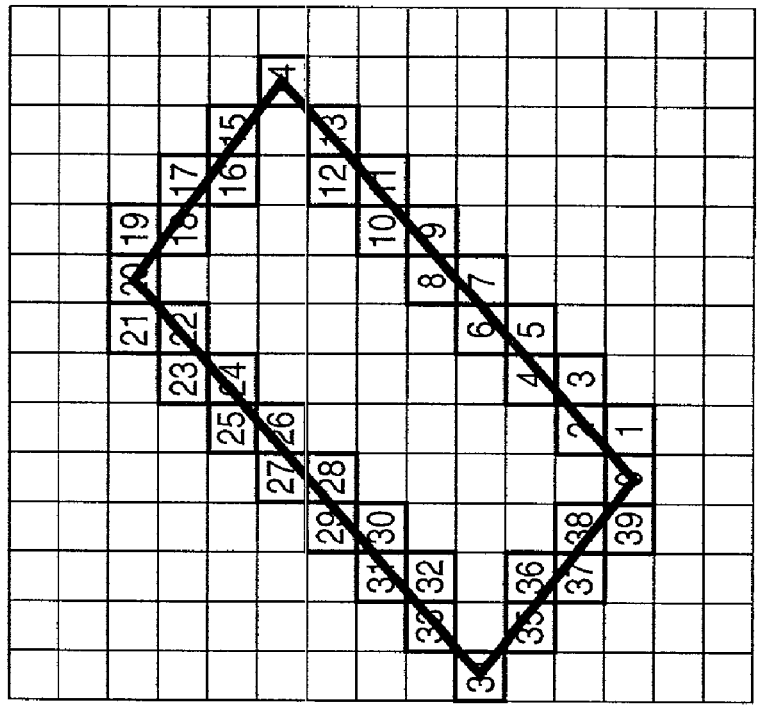
FIGS. 10A and 10B are explanatory views showing the effect of a curve classification method used in this embodiment.
Figure 10A:
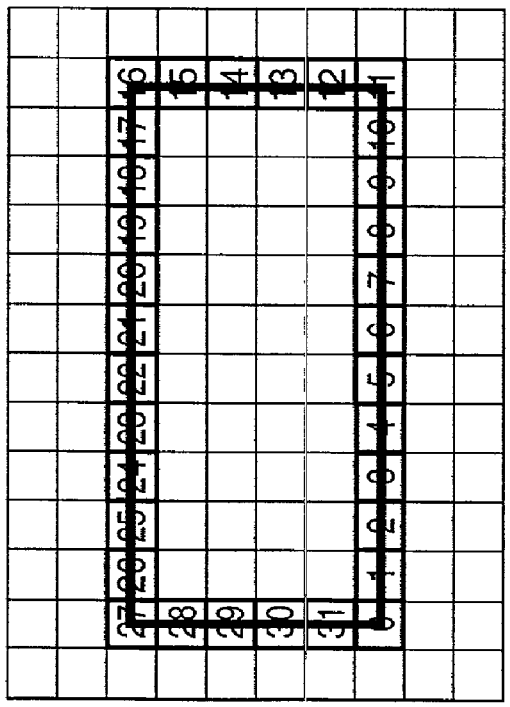
Figure 11:
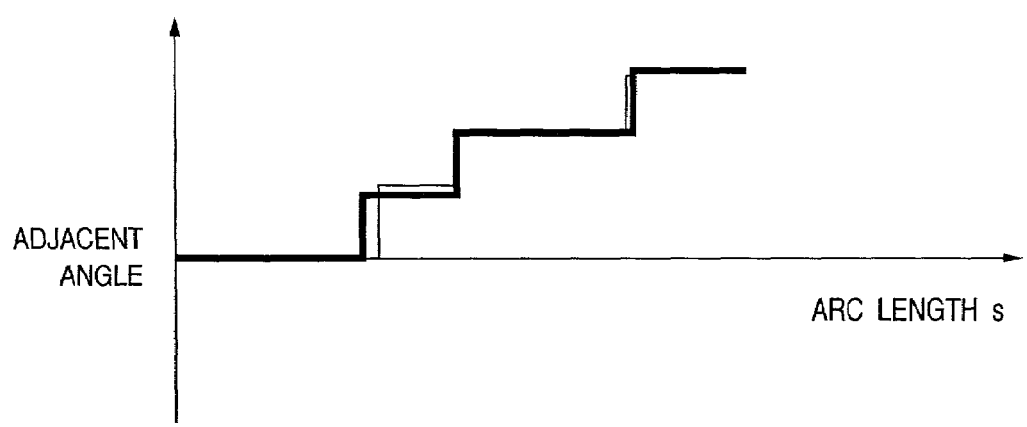
FIG. 11 is an explanatory view showing the effect of a curve classification method used in this embodiment.

In practice, both straight lines which agree with the pixel lattices shown in FIG. 10A and those which are oblique, as shown in FIG. 10B, have nearly the same adjacent angle distributions. That is, as can be seen from FIG. 11, affine characteristics are recovered approximately. In FIG. 11, the abscissa plots the arc length, and the ordinate plots the adjacent angle. The bold curve indicates a case wherein the straight lines agree with the pixel direction, as shown in FIG. 10A, and the thin curve indicates a case wherein the straight lines are oblique, as shown in FIG. 10B. The relationship between the adjacent angle and arc length gives nearly the same distributions before and after transformation, i.e., rotation, unlike the pseudo curvature function shown in FIG. 22.

Referring back to FIG. 7A, the line segments are equally divided along the arc length from their ends in step S3. The number of divisions is a predetermined value N to equally divide the total arc length into N. In step S4, the adjacent angle distribution is calculated.

Figure 7B:
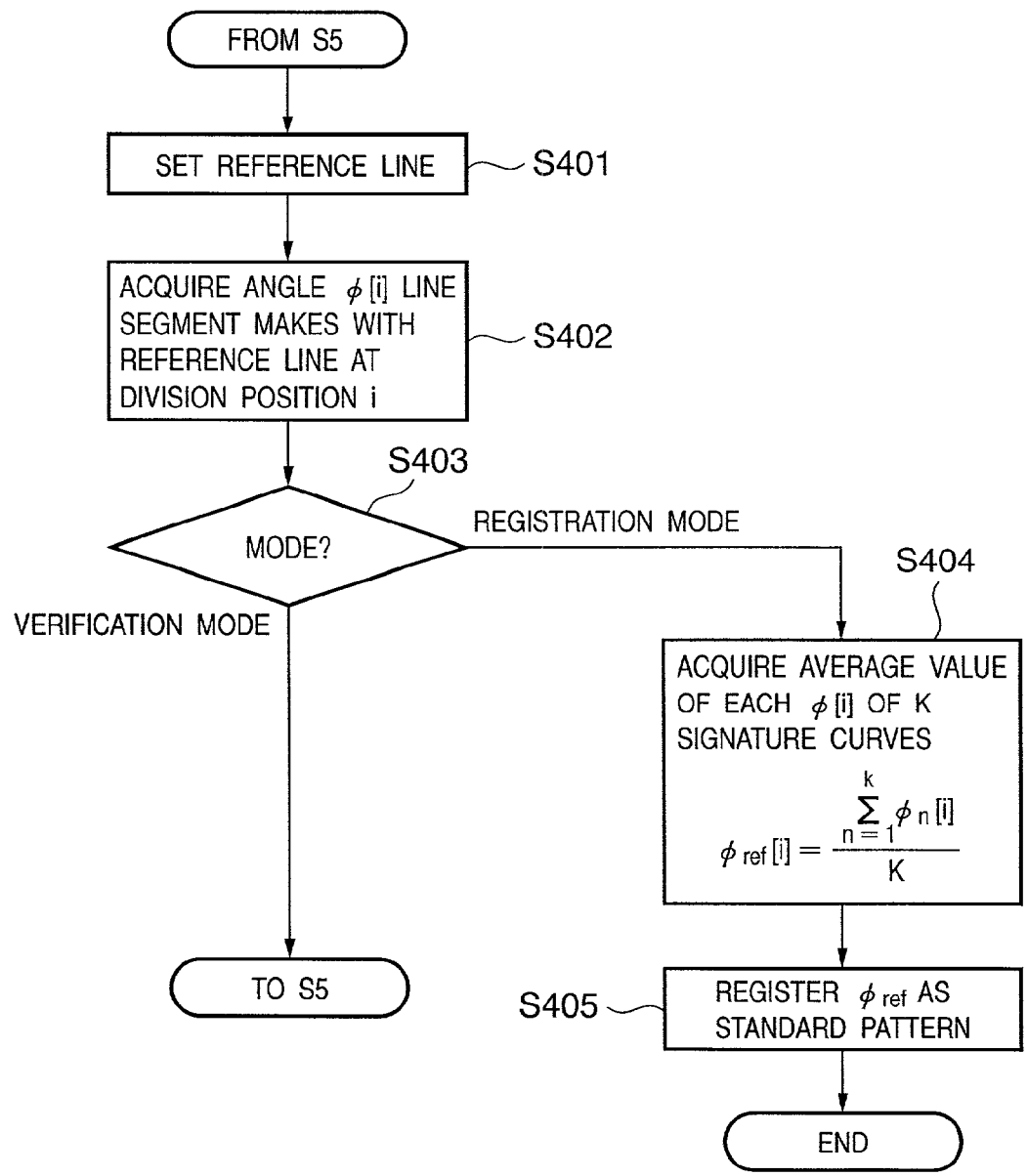

FIG. 7B is a flow chart showing the calculation of the adjacent angle distribution in step S4.

A straight line defined by the start and end points of the signature curve (the line segment 1023 in FIG. 9A, i.e., the line segment of first layer) is selected to define a reference angle (step S401). The direction of this line is set as zero angle to define an adjacent angle at each division point (step S402). That is, an adjacent angle $\phi$ ($\phi[i]$, i=1 to N) at each division position i is obtained. Note that the adjacent angle $\phi$ can be defined even in an undifferentiable curve since it is obtained by integrating curvatures $d\phi/ds$ for the arc length. Or the adjacent angle can be defined at least in the sense of the theory of distribution. The obtained adjacent angles $\phi[i]$ are as shown in FIG. 3C. If the operation mode is the verification mode, the flow advances from step S403 to step S5 in FIG. 7A. In the signature verification apparatus of this embodiment, one of the verification mode for verifying an input pattern, and the registration mode for registering a standard pattern for the verification process can be set. In case of the registration mode, the flow advances from step s403 to step S404. This process will be described later.

In step S5, the adjacent angle distribution is compared with an angle distribution $\{\phi_{ref}[i]\}$ as a standard pattern indicated by the bold curve in FIG. 3D. As the comparison method, S is calculated by:

$$S = \sum_{i}^{N} \min(|\phi[i] - \phi_{ref}[i]|, |2\pi - \phi[i] - \phi_{ref}[i]|, |2\pi + \phi[i] - \phi_{ref}[i]|) \quad (2)$$

and the value S is set as the matching level. Then, verification is made by checking if this matching level exceeds a predetermined threshold value. Some standard patterns may be prepared, if necessary, and one of the standard patterns, which has the highest matching level with the input pattern, may be determined to classify a shape.

After that, an end message and the matching result are displayed on the monitor 118 shown in FIGS. 5 and 6. If the matching result is equal to or higher than the threshold value, it is determined that the signature matches the standard signature, thus identifying a given person.

When the registration mode for registering the standard pattern is set, the flow advances from step S403 to step S404 in FIG. 7B. As a method of generating a standard signature adjacent angle distribution, i.e., a standard pattern, (1) the aforementioned adjacent angle distribution of the signature curve input in advance is calculated, and is registered; or (2) the aforementioned adjacent angle distributions of a predetermined number of signature curves are calculated, and a distribution defined by mean adjacent angles at each point of the obtained distributions is registered.

FIG. 7B shows the registration method (2). That is, a mean value (a total of $\phi_1[i]$ to $\phi_K[i]$ is divided by K) of angles of the line segments at each point i is calculated to obtain a distribution $\phi_{ref}[i]$ in step S404, and this distribution is saved as a standard pattern in the memory in step S405. In case of the registration method (1), the adjacent angle distribution $\phi[i]$ obtained in step S402 may be directly saved in the memory as a standard pattern $\phi_{ref}[i]$ while skipping step S404. In this embodiment, the aforementioned functions are implemented using the apparatus shown in FIG. 5, thus generating a standard pattern.

As described above, according to this embodiment, since pattern matching of the signature curve is done on the basis of the adjacent angle distribution, which is obtained by converting the input signature curve into line segments, and calculating adjacent angles at respective points obtained by equally dividing the line segments by a predetermined constant, signature classification which is approximately invariant to affine transformation and suffers less influences of discretization errors can be implemented.

The shape of the input signature can be determined without adopting any indeterminate processing method such as a neural network that uses process history, and a verification method in which only a pure fluctuation of the signature itself becomes a fluctuation can be provided.

<Second Embodiment>

In the first embodiment, the entire standard signature adjacent angle distribution used as the standard pattern undergoes pattern matching. However, signatures written by a person include portions with large change, i.e., portions with large fluctuation, and if pattern matching is done using the signature including such large fluctuations, matching precision may be lowered. In the second embodiment, upon pattern matching between the adjacent angle distributions, a matching process is done after such portions with large fluctuation are removed.

Detection of portions with large fluctuation in the second embodiment will be described below.

Figure 12A:
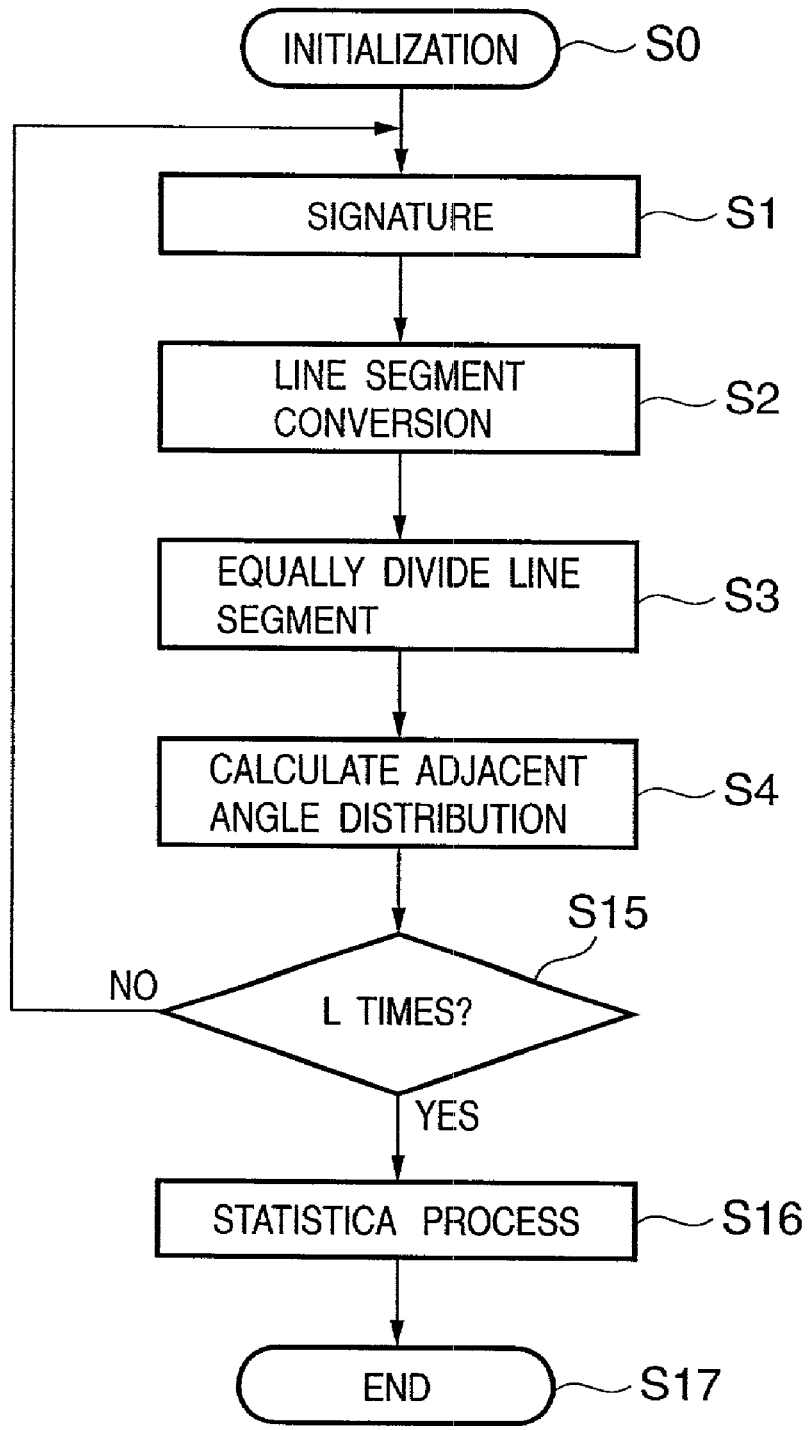
FIGS. 12A and 12B are flow charts for explaining the registration sequence of a standard pattern (standard signature adjacent angle distribution) and a portion to be removed upon matching (a portion with large fluctuation) according to the second embodiment.

FIG. 12A is a flow chart for explaining the registration sequence of a standard pattern (standard signature adjacent angle distribution) and portions (portions with large fluctuation) to be removed upon matching. Note that the processes in steps S0 to S4 are the same as those in the first embodiment (FIG. 7A), and a description thereof will be omitted.

As described above, with the processes in steps S0 to S4, input data of the written signature input to generate a standard pattern is converted into line segments, which are equally divided to obtain an adjacent angle distribution $\phi[i]$.

The aforementioned processes are repeated L times (about 10 times in this example) to acquire L distributions $\phi[i]$, which are held as the standard adjacent angle distribution in the storage device in the verification apparatus, or an IC card or an external storage device connected via the computer network. The flow then advances from step S15 to S16, and the held L distributions $\phi[i]$ are statistically processed to acquire a standard pattern and non-matching objective regions, thus registering the results.

Figure 12B:
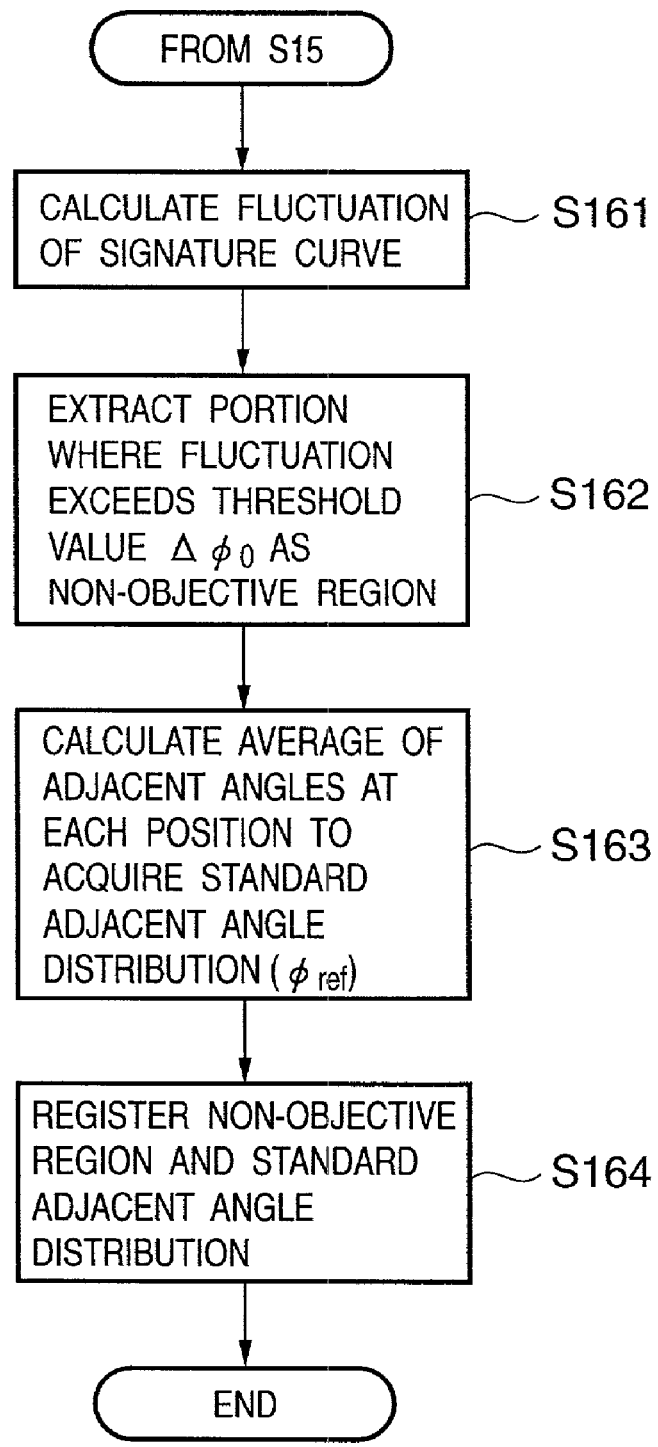
Figure 13A:
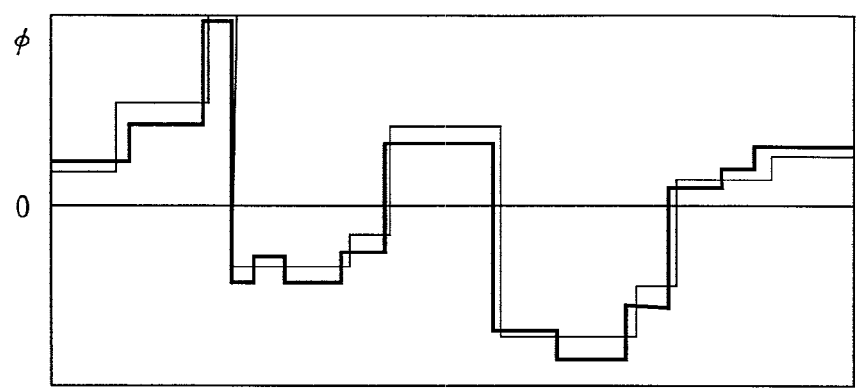
FIGS. 13A to 13C are views for explaining the statistical process according to the second embodiment.
Figure 13B:
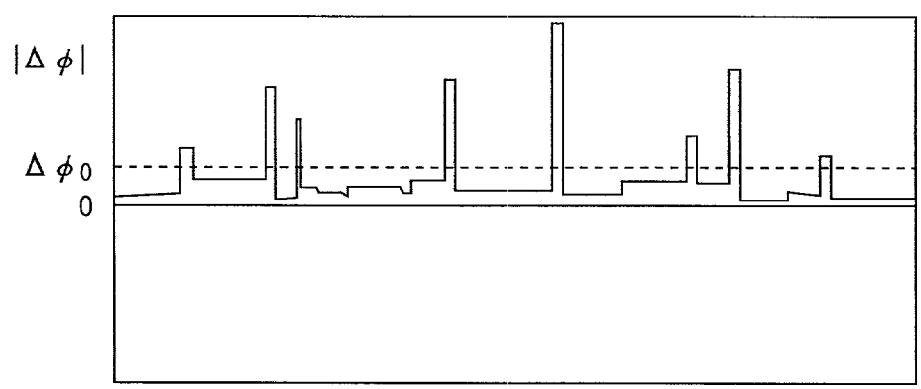
Figure 13C:
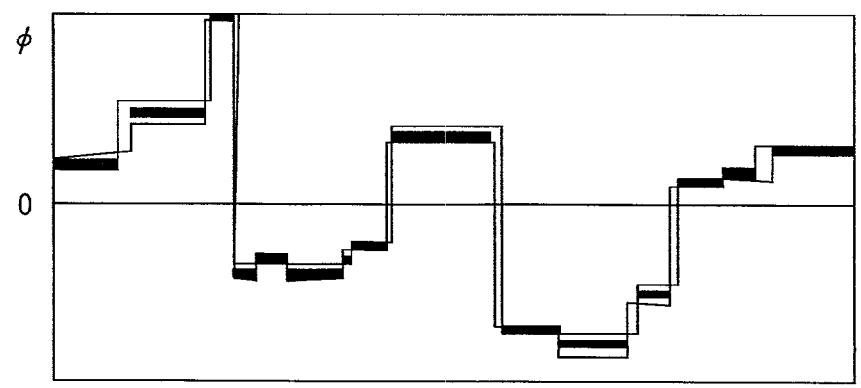
Figure 14:
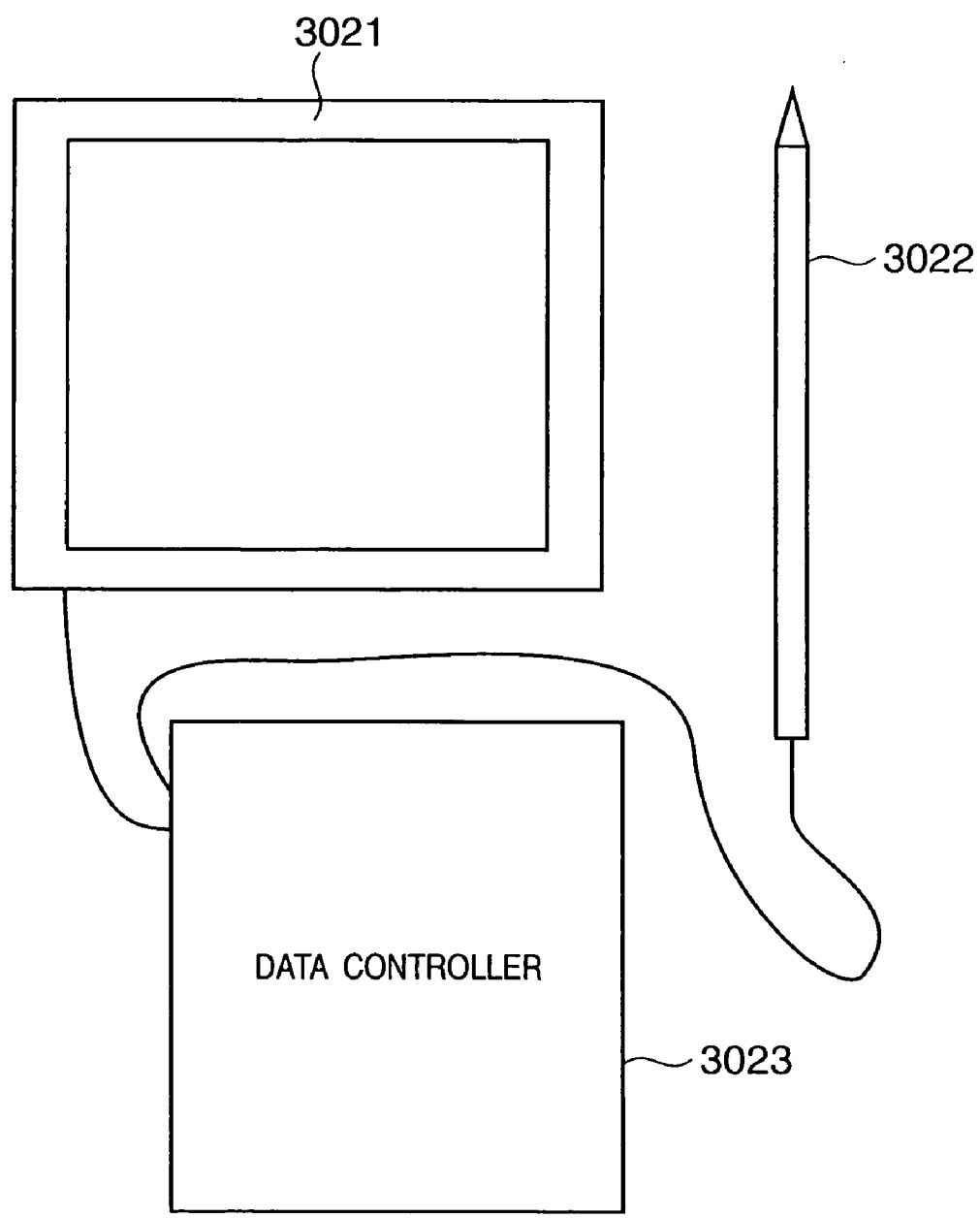
FIG. 14 is a schematic view showing the arrangement of a conventional signature verification apparatus.
Figure 15:
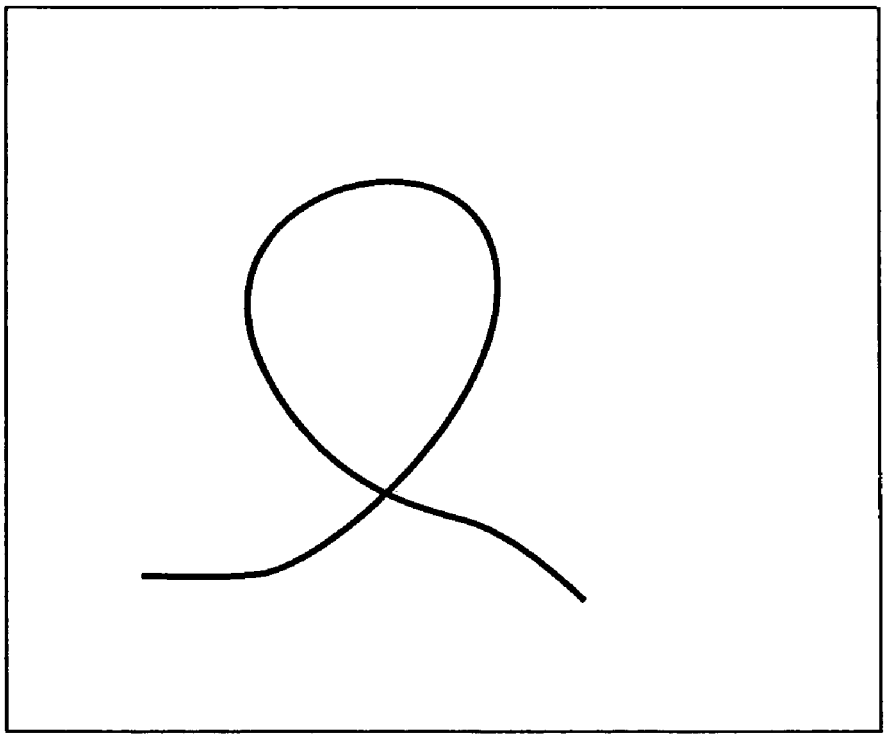
FIG. 15 shows an example of a curve immersed in a two-dimensional plane.
Figure 16A:
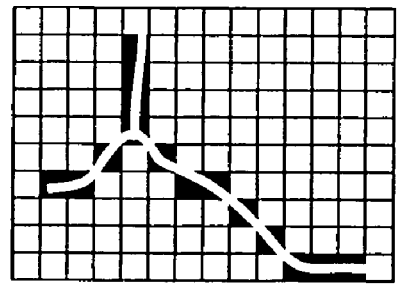
FIGS. 16A to 16D are explanatory views of a conventional curve classification method.
Figure 16B:
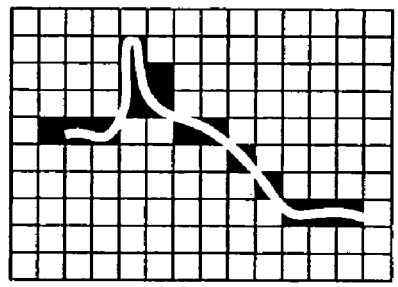
Figure 16C:
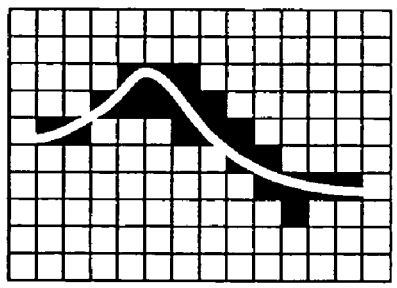
Figure 16D:
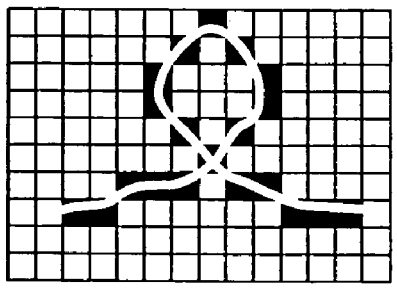
Figure 17A:
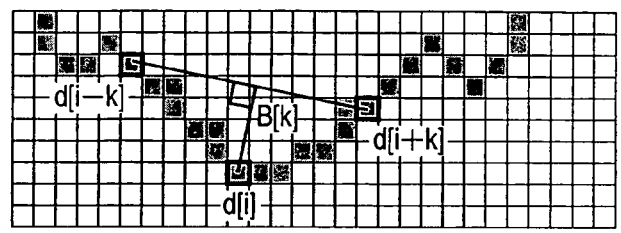
FIGS. 17A to 17C are views for explaining the conventional definition of a curvature.
Figure 17B:
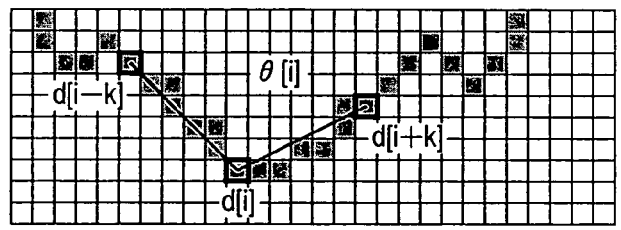
Figure 17C:
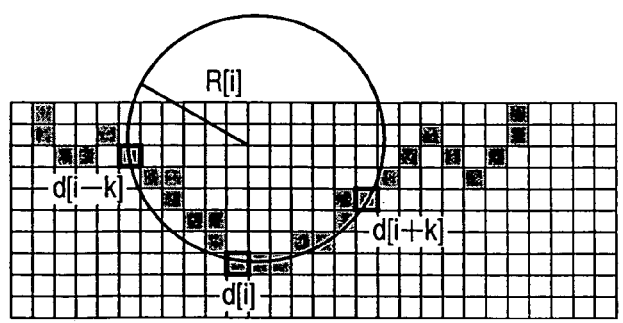
Figure 18:
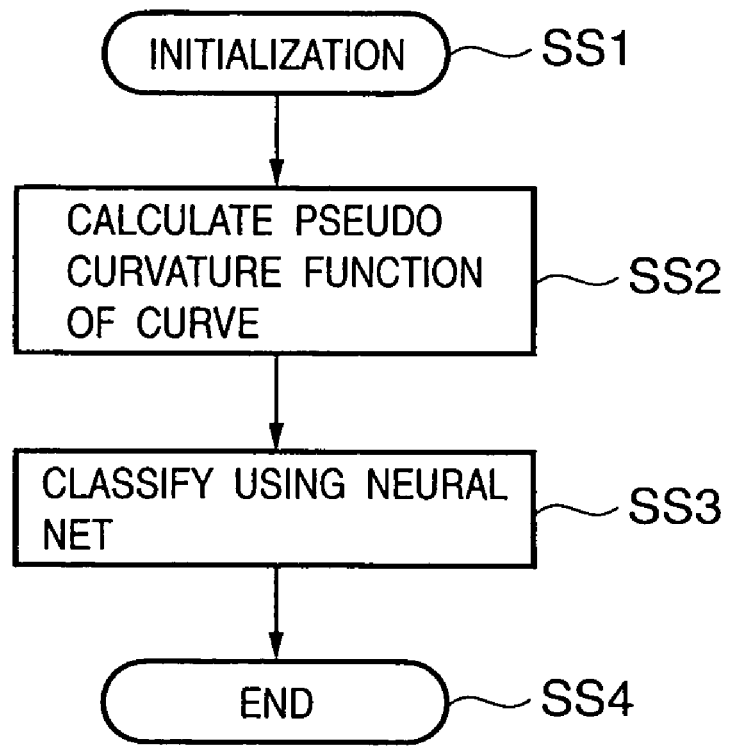
FIG. 18 is a flow chart for explaining the conventional curve classification method.
Figure 19:
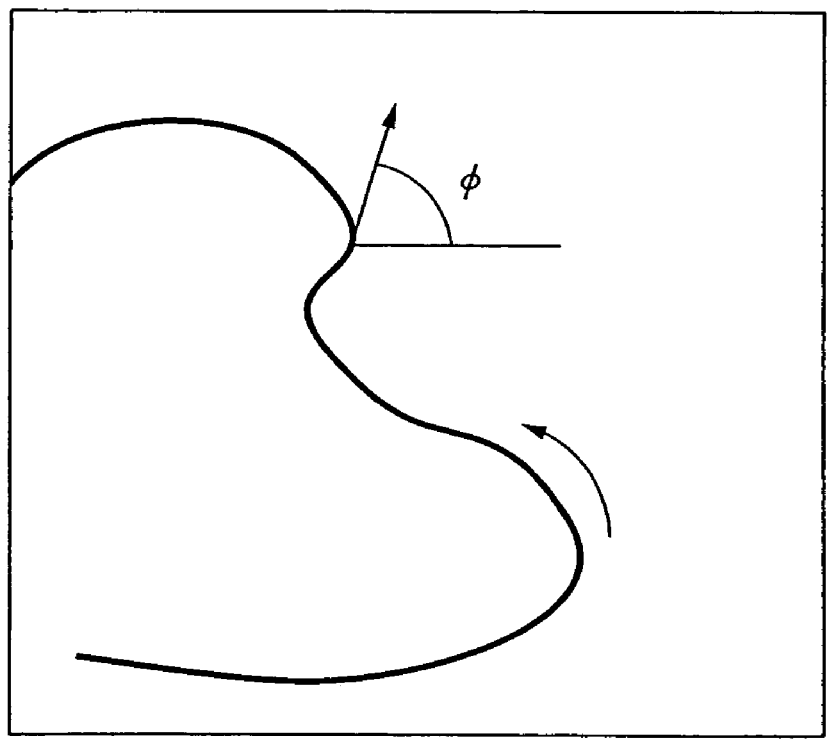
FIG. 19 is a view for explaining an adjacent angle.
Figure 20A:
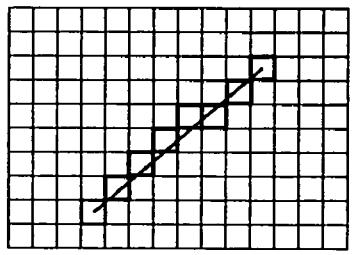
FIGS. 20A and 20B are views for explaining uncertainty of dots that express identical line segments.
Figure 20B:
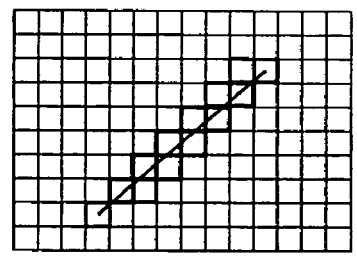
Figure 21B:
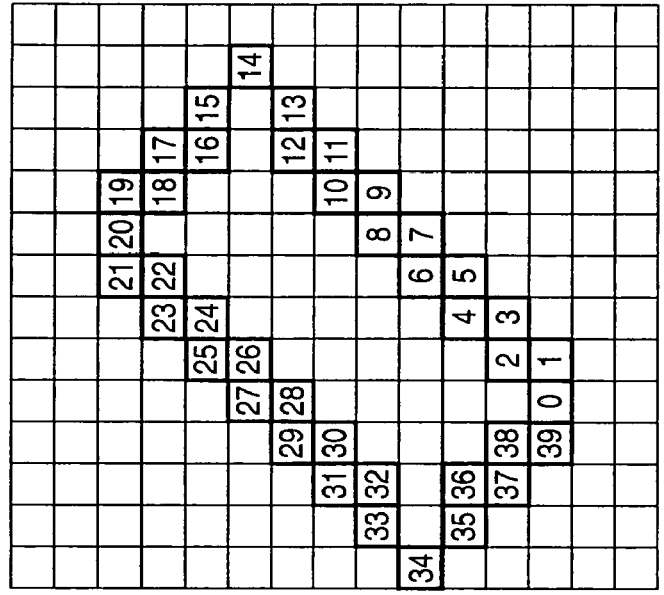
FIGS. 21A and 21B are views for explaining the conventional problems.
Figure 21A:
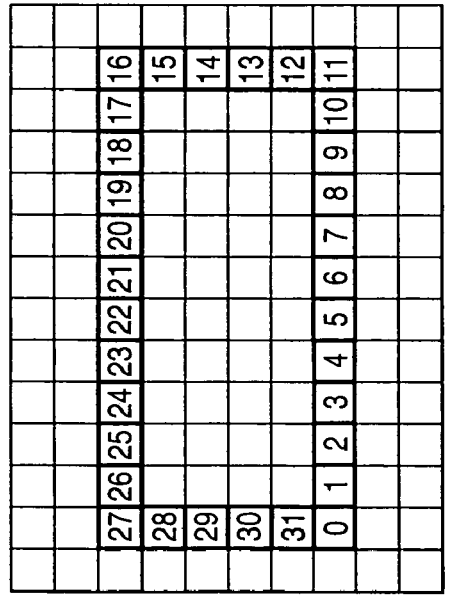

FIG. 12B is a flow chart for explaining the statistical process in step S16. FIGS. 13A to 13C are views for explaining the statistical process according to the second embodiment. FIG. 13A shows two angle distributions $\phi_1[i]$ (bold curve) and $\phi_2[i]$ (thin curve) obtained from the two signature curves. In step S161, the magnitude of fluctuation between the two signature curves is calculated using these distributions by computing:

$$\Delta\phi[i]=\min(|\phi_1[i]-\phi_2[i]|,|2\pi-\phi_1[i]+\phi_2[i]|,|2\pi+\phi_1[i]-100\ _2[i]|) \quad \ldots(3)$$

FIG. 13B shows the magnitude of $\Delta\phi[i]$, i.e., $|\Delta\phi[i]|$ obtained by the above equation. As shown in FIG. 13B, portions where $|\Delta\phi[i]|$ fluctuate largely are present. Hence, a threshold value $\Delta\phi_0$ is prepared, and portions where $|\Delta\phi[i]|$ assumes values equal to or larger than that threshold value are defined as unstable regions (step S162). These unstable regions are set as regions whose values are not used in a matching process upon signature verification, i.e., non-matching objective regions, since large fluctuations are observed in every signature. When the result shown in FIG. 13B is obtained, matching objective regions are portions indicated by the bold lines in FIG. 13C, and non-matching objective regions are portions which are not indicated by the bold lines.

The aforementioned statistical process is done for a plurality of (L, about 10 in this embodiment) signature curves, and average portions with large fluctuations based are determined to be unstable regions, i.e., those which do not undergo pattern matching. In this way, by setting the non-matching objective regions, portions where the distribution fluctuates largely every input can be prevented from being used in pattern matching, and the reliability of a matching process upon verification can be improved. Note that the adjacent angle distribution values other than the unstable regions use the average values (step S163).

In step S164, information indicating the matching objective regions (or information indicating the non-matching objective regions) and the adjacent angle distribution values (average values) of the matching objective regions are saved as a standard pattern in the memory. Since the information indicating the matching objective regions is registered, the average adjacent angle distribution values of either only the matching objective regions or the entire distribution may be registered.

Upon evaluation of fluctuation and/or calculation of the average value of each matching objective regions, evaluation may be made by excluding some of data indicating large fluctuation at that portion from a statistical process. For example, upon calculation of fluctuation and average value, data indicating the largest fluctuation at that portion may be excluded from the statistical process, and the statistical process may be executed for the remaining L-1 data.

The standard pattern and matching objective regions obtained in this way are held as standard data. The verification process uses the standard data. The verification process has been explained in the first embodiment (FIG. 7A). However, upon calculating the matching level using equation (2) in the pattern matching process in step S5, $\phi_{ref}$ is the average value of the adjacent angle, and i indicates only the matching objective region.

<Another Embodiment>

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, more accurate pattern matching of a handwritten input, which is approximately invariant to affine transformation and can reduce the influence of discretization errors can be improved.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus comprising:
   acquisition means for acquiring an input coordinate sequence generated by sampling a handwritten input pattern at predetermined intervals;
   line segment conversion means for converting a pattern expressed by the input coordinate sequence into line segments by approximating the pattern by coupling a plurality of line segments;
   generation means for generating angle distribution data on the basis of directions of the line segments obtained by said line segment conversion means; and
   matching means for executing a matching process of a pattern by comparing the angle distribution data generated by said generation means with angle distribution data of a standard pattern.

2. The apparatus according to claim 1, further comprising:
   registration means for registering the angle distribution of the standard pattern on the basis of the angle distribution data generated by said generation means, and
   wherein said matching means discriminates similarity of the handwritten input pattern using the angle distribution data of the standard pattern registered by said registration means.

3. The apparatus according to claim 2, wherein said registration means registers angle distribution data defined by average angles at respective positions of a plurality of angle distribution data obtained from a plurality of input coordinate sequences.

4. The apparatus according to claim 2, wherein said registration means comprises:
   indeterminate region extraction means for extracting portions where deviations of distribution values exceed a predetermined value from a plurality of angle distribution data obtained for a plurality of input coordinate sequences as indeterminate regions; and
   angle distribution data generation means for generating standard angle distribution data based on the plurality of angle distribution data, and
   said registration means registers as the standard patterns information indicating the indeterminate regions extracted by said indeterminate region extraction means and the standard angle distribution data.

5. The apparatus according to claim 4, wherein said matching means discriminates similarity with a handwritten input pattern using the angle distribution data registered by said registration means except fo the indeterminate regions.

6. The apparatus according to claim 4, wherein said angle distribution data generation means generates standard angle distribution data using average values of angle distribution values in the plurality of angle distribution data.

7. The apparatus according to claim 1, wherein said generation means comprises:
setting means for setting an angle of a reference line with respect to a horizontal direction, the angle of the reference line being determined on the basis of the input coordinate sequence, and
said generation means generates the angle distribution data by calculating angles the respective line segments obtained by said line segment conversion means make with the reference line.

8. The apparatus according to claim 7, wherein said setting means sets a line segment that connects start and end coordinates of the input coordinate sequence as the reference line.

9. The apparatus according to claim 7, wherein said generation means generates the angle distribution data on the basis of angle division positions make with the reference line, the division positions being obtained by equally dividing a total line segment length as a sum of lengths along line segments of all line segments obtained by said line segment conversion means.

10. The apparatus according to claim 1, wherein said acquisition means acquires an input coordinate sequence using a digitizer.

11. The apparatus according to claim 1, wherein if the handwritten input pattern is written by a plurality of strokes, said acquisition means acquires the input coordinate sequence by sampling a pattern generated by interpolating a predetermined line between the strokes.

12. An information processing method comprising:
the acquisition step of acquiring an input coordinate sequence generated by sampling an handwritten input patten at predetermined intervals;
the line segment conversion step of converting a pattern expressed by approximating the pattern by coupling a plurality of line segments;
the generation step of generating angle distribution data on the basis of directions of the line segments obtained in the line segment conversion step; and
the matching step of executing a matching process of a pattern by comparing the angle distribution data generated in the generation step with angle distribution data of a standard pattern.

13. The method according to claim 12, further comprising:
the registration step of registering the angle distribution of the standard pattern on the basis of the angle distribution data generated in the generated in the generation step, and
wherein the matching step includes the step of discriminating similarity of the handwritten input pattern using the angle distribution data of the standard pattern registered in the registration step.

14. The method according to claim 13, wherein the registration step includes the step of registering angle distribution data defined by average angles at respective positions of a plurality of angle distribution data obtained from a plurality of input coordinate sequences.

15. The method according to claim 13, wherein the registration step comprises:
the indeterminate region extraction step of extracting step of extracting portions where deviations of distribution values exceed a predetermined value from a plurality of angle distribution obtained for a plurality of input coordinate sequences as indeterminate regions; and
the angle distribution data generation step of generating standard angle distribution data based on the plurality of angle distribution data, and
the registration step includes the step of registering as the standard pattern information indicating the indeterminate regions extracted in the indeterminate region extraction step and the standard angle distribution data.

16. The method according to claim 15, wherein the matching step includes the step of discriminating similarity with a handwritten input pattern using the angle distribution data registered in the registration step except for the indeterminate regions.

17. The method according to claim 15, wherein the angle distribution data generation step includes the step of generating standard angle distribution data using average values of angle distribution values in the plurality of angle distribution data.

18. The method according to claim 12, wherein the generation step comprises:
the setting step of setting an angle of a reference line with respect to a horizontal direction, the angle of the reference line being determined on the basis of the input coordinate sequence, and
the generation step includes the step of generating the angle distribution data by calculating angles the respective line segments obtained in the line segment conversion step make with the reference line.

19. The method according to claim 18, wherein the setting step includes the step of setting a line segment that connects start and end coordinates of the input coordinate sequence as the reference line.

20. The method according to claim 18, wherein the generation step includes the step of generation the angle distribution data on the basis of angles division positions make with the reference line, the division positions being obtained by equally dividing a total line segment length as a sum of lengths along line segments of all line segments obtained in the line segment conversion step.

21. The method according to claim 12, wherein the acquisition step includes the step of acquiring an input coordinate sequence using a digitizer.

22. A storage medium that stores a control program for making a computer implement a method cited in claim 12.

23. A computer program embodied in a computer readable medium, that comprises program codes for making a computer implement a method cited in claim 11.

24. The method according to claim 12, wherein if the handwritten input pattern is written by a plurality of strokes, said acquisition step acquires the input coordinate sequence by sampling a pattern generated by interpolating a predetermined line between the strokes.

* * * * *

UNITED STATES PATENT AND TRADEMARK OFFICE
CERTIFICATE OF CORRECTION

PATENT NO. : 7,068,821 B2 Page 1 of 1
APPLICATION NO. : 10/052463
DATED : June 27, 2006
INVENTOR(S) : Shigeki Matsutani It is certified that error appears in the above-identified patent and that said Letters Patent is hereby corrected as shown below:

DRAWING SHEET NO. 14 of 25:
Figure 12A, "STATISTICA" should read --STATISTICAL--.

COLUMN 14:
Line 59, "-$100_2[i]|$)" should read --$\Phi_2[i]$)--.

COLUMN 17:
Line 19, "angle" should read --angles--.
Line 34, "an" should read --a--.
Line 35, "patten" should read --pattern--.
Line 50, "generated in the" (2nd occurrence) should be deleted.

COLUMN 18:
Line 6, "distribution" should read --distribution data--.
Line 40, "generation" should read --generating--.
Line 53, "claim 11." should read --claim 12.--.

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,068,821 B2 Page 1 of 1
APPLICATION NO. : 10/052463
DATED : June 27, 2006
INVENTOR(S) : Shigeki Matsutani It is certified that error appears in the above-identified patent and that said Letters Patent is hereby corrected as shown below:

ON THE TITLE PAGE ITEM (56), PAGE 2, COLUMN 2, LINE 5,
Other Publications, ""Dynamic Programming Methods II", T. Yong et al. Handbook of Pattern Recognition and Image Processing, Academic Press, 1996, pps. 501-509" should read --"Dynamic Programming Methods II", T. Yong et al. Handbook of Pattern Recognition and Image Processing, Academic Press, 1986, pps. 501-509--.

Signed and Sealed this

Fifth Day of June, 2007

JON W. DUDAS
*Director of the United States Patent and Trademark Office*